US009733864B2

(12) United States Patent
Moon et al.

(10) Patent No.: US 9,733,864 B2
(45) Date of Patent: Aug. 15, 2017

(54) MEMORY SYSTEM INCLUDING NONVOLATILE MEMORY DEVICE AND ERASE METHOD THEREOF

(71) Applicants: Sangkwon Moon, Pyeongtaek-si (KR); Jihong Kim, Seoul (KR); Jaeyong Jeong, Yongin-si (KR); Kyung Ho Kim, Seoul (KR)

(72) Inventors: Sangkwon Moon, Pyeongtaek-si (KR); Jihong Kim, Seoul (KR); Jaeyong Jeong, Yongin-si (KR); Kyung Ho Kim, Seoul (KR)

(73) Assignees: Samsung Electronics Co., Ltd., Gyeonggi-do (KR); SNU R&DB Foundation, Seoul (KR)

( * ) Notice: Subject to any disclaimer, the term of this patent is extended or adjusted under 35 U.S.C. 154(b) by 177 days.

(21) Appl. No.: 14/527,092

(22) Filed: Oct. 29, 2014

(65) Prior Publication Data

US 2015/0205539 A1 Jul. 23, 2015

(30) Foreign Application Priority Data

Jan. 21, 2014 (KR) .................. 10-2014-0007357

(51) Int. Cl.
*G06F 3/06* (2006.01)
*G06F 12/02* (2006.01)

(52) U.S. Cl.
CPC .......... *G06F 3/0652* (2013.01); *G06F 3/0616* (2013.01); *G06F 3/0679* (2013.01); *G06F 12/0246* (2013.01); *G06F 2212/72* (2013.01)

(58) Field of Classification Search
CPC .... G06F 3/0616; G06F 3/0679; G06F 3/0652; G06F 3/0614–3/0619; G06F 3/062–3/0623; G06F 3/0625; G09G 2330/027
USPC ... 365/185.19, 185.2, 185.24, 185.29, 185.3, 365/185.33; 711/103
See application file for complete search history.

(56) References Cited

U.S. PATENT DOCUMENTS

| 7,369,440 B2 | 5/2008 | Shappir et al. |
| 7,430,138 B2 | 9/2008 | Higashitani |
| 7,835,193 B2 | 11/2010 | Lee |
| 8,422,312 B2 | 4/2013 | Sarin |
| 2006/0158938 A1 | 7/2006 | Shappir et al. |

(Continued)

FOREIGN PATENT DOCUMENTS

| KR | 1009210114 A1 | 10/2000 |
| KR | 100895855 B1 | 5/2009 |

(Continued)

*Primary Examiner* — Reginald Bragdon
*Assistant Examiner* — Aaron D Ho
(74) *Attorney, Agent, or Firm* — Harness, Dickey & Pierce, P.L.C.

(57) ABSTRACT

An erase method of a nonvolatile memory device is provided which includes receiving an erase request; selecting an erase mode of a memory block corresponding to the erase request, based on an access condition of the nonvolatile memory device managed by a memory controller; and controlling the nonvolatile memory device to erase the memory block according to the selected erase mode. The erase mode includes a fast erase mode of which an erase time for the memory block is shorter than a reference time and a slow erase mode of which an erase time for the memory block is longer than the reference time.

12 Claims, 18 Drawing Sheets

(56) References Cited

U.S. PATENT DOCUMENTS

| | | |
|---|---|---|
| 2006/0221708 A1 | 10/2006 | Higashitani |
| 2008/0172525 A1* | 7/2008 | Nakamura ............ G06F 3/0608 |
| | | 711/113 |
| 2008/0285355 A1 | 11/2008 | Lee |
| 2010/0272174 A1* | 10/2010 | Toma .................. H04N 19/426 |
| | | 375/240.12 |
| 2011/0126045 A1* | 5/2011 | Bennett ............... G06F 11/1068 |
| | | 714/6.22 |
| 2011/0138387 A1 | 6/2011 | Ahn et al. |
| 2012/0106261 A1 | 5/2012 | Sarin |
| 2013/0151021 A1 | 6/2013 | Kim |
| 2013/0242665 A1* | 9/2013 | Hung ..................... G11C 16/14 |
| | | 365/185.19 |
| 2014/0269090 A1* | 9/2014 | Flynn .................... G11C 16/14 |
| | | 365/185.19 |
| 2014/0369124 A1 | 12/2014 | Moon et al. |

FOREIGN PATENT DOCUMENTS

| | | |
|---|---|---|
| KR | 100902587 B1 | 6/2009 |
| KR | 100909720 B1 | 7/2009 |
| KR | 1020110050514 A | 5/2011 |
| KR | 101070317 B1 | 10/2011 |
| KR | 1020130063949 A | 6/2013 |
| KR | 1020140145063 | 12/2014 |

\* cited by examiner

FIG. 4
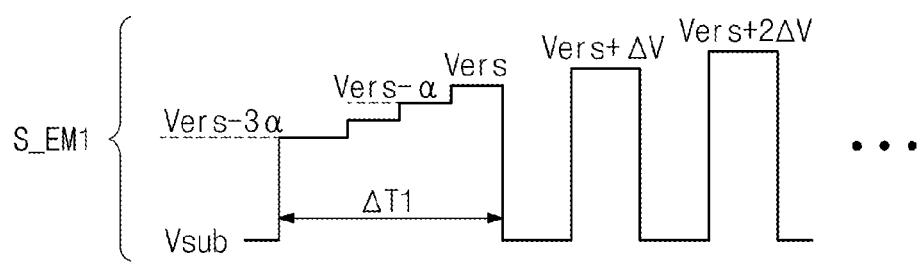
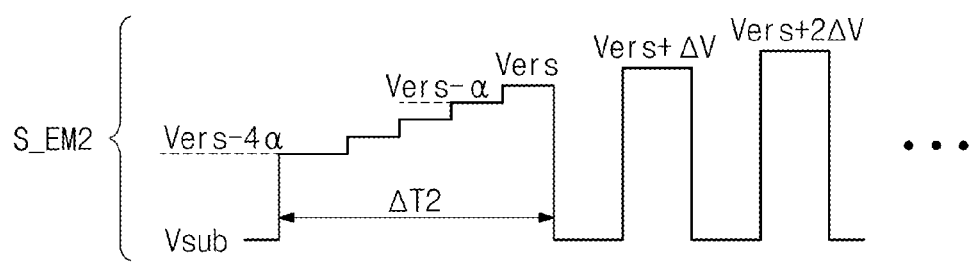
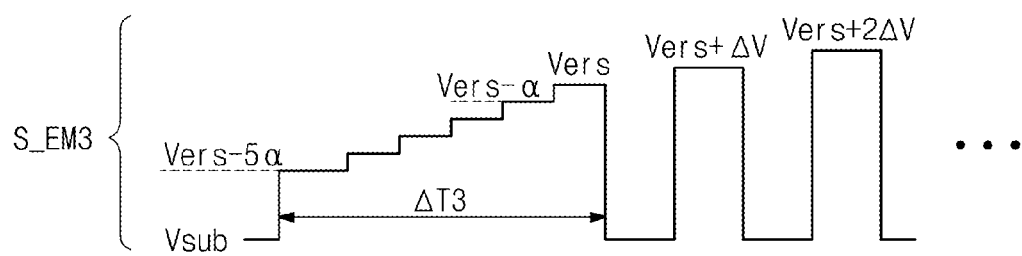

MEMORY SYSTEM INCLUDING NONVOLATILE MEMORY DEVICE AND ERASE METHOD THEREOF

CROSS-REFERENCE TO RELATED APPLICATIONS

A claim for priority under 35 U.S.C. §119 is made to Korean Patent Application No. 10-2014-0007357 filed Jan. 21, 2014, in the Korean Intellectual Property Office, the entire contents of which are hereby incorporated by reference.

BACKGROUND

The inventive concepts described herein relate to a semiconductor memory device, and more particularly, relate to a memory system including a nonvolatile memory device and an erase method thereof.

Semiconductor memory devices may be volatile or nonvolatile. Volatile semiconductor memory devices may perform read and write operations at high speed, while contents stored therein may be lost at power-off. Nonvolatile semiconductor memory devices may retain contents stored therein even at power-off. The nonvolatile semiconductor memory devices may be used to store contents which must be retained regardless of whether they are powered.

A flash memory device may be a typical nonvolatile semiconductor memory device. The flash memory device may be widely used as a voice and image data storing medium of information appliances, such as a computer, a cellular phone, a PDA, a digital camera, a camcorder, a voice recorder, an MP3 player, a handheld PC, a game machine, a facsimile, a scanner, a printer, and the like. In recent years, there may have been researched techniques for mass storage, high-speed input/output and low power of nonvolatile memory devices to be mounted on mobile devices including a smart phone.

The inventive concepts may provide an erase method of a nonvolatile memory device that is capable of lengthening its lifetime and/or improving reliability of data.

SUMMARY

As least one example embodiment of the inventive concepts is directed to provide an erase method of a nonvolatile memory device comprising receiving an erase request; selecting an erase mode of a memory block corresponding to the erase request, based on an access condition of the nonvolatile memory device managed by a memory controller; and controlling the nonvolatile memory device to erase the memory block according to the selected erase mode, wherein the erase mode is divided into a fast erase mode where an erase time about the memory block is shorter than a reference time and a slow erase mode where the erase time about the memory block is longer than a reference time.

At least one example embodiment of the inventive concepts is directed to provide a mobile device comprising a host including a screen or a user interface; and a memory system performing one of a plurality of erase modes with different erase speeds to erase a selected memory block according to an erase command from the host. The memory system comprises a nonvolatile memory device including a plurality of memory blocks each forming an erase unit and configured to erase a selected memory block according to a plurality of erase modes with different erase times; and a memory controller configured to control an erase operation of the nonvolatile memory device according to an erase command from the host. The host provides the memory system with an erase command including information about an erase speed according to a status of the screen or the user interface.

With at least one example embodiment of the inventive concepts, a nonvolatile memory device may adjust a time taken to erase a memory block dynamically. A memory block may deteriorate in proportion to an erase time. Thus, there may be lengthened a lifetime of the nonvolatile memory device that is limited according to an increase in erase time about the memory block.

With at least one example embodiment of the inventive concepts, a storage device comprising: a nonvolatile memory device including a plurality of memory blocks and configured to erase a selected memory block according to an erase mode among a plurality of erase modes with different erase times; and a memory controller including a write buffer and configured to determine an erase mode of the selected memory block with reference to a state of the write buffer, wherein the plurality of erase modes comprises a fast erase mode of which an erase time is shorter than a reference time and a slow erase mode of which the erase time is longer than the reference time.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 4 is a waveform diagram schematically illustrating a variety of slow erase modes according to at least one example embodiment of the inventive concepts;

DETAILED DESCRIPTION

Figure 1:
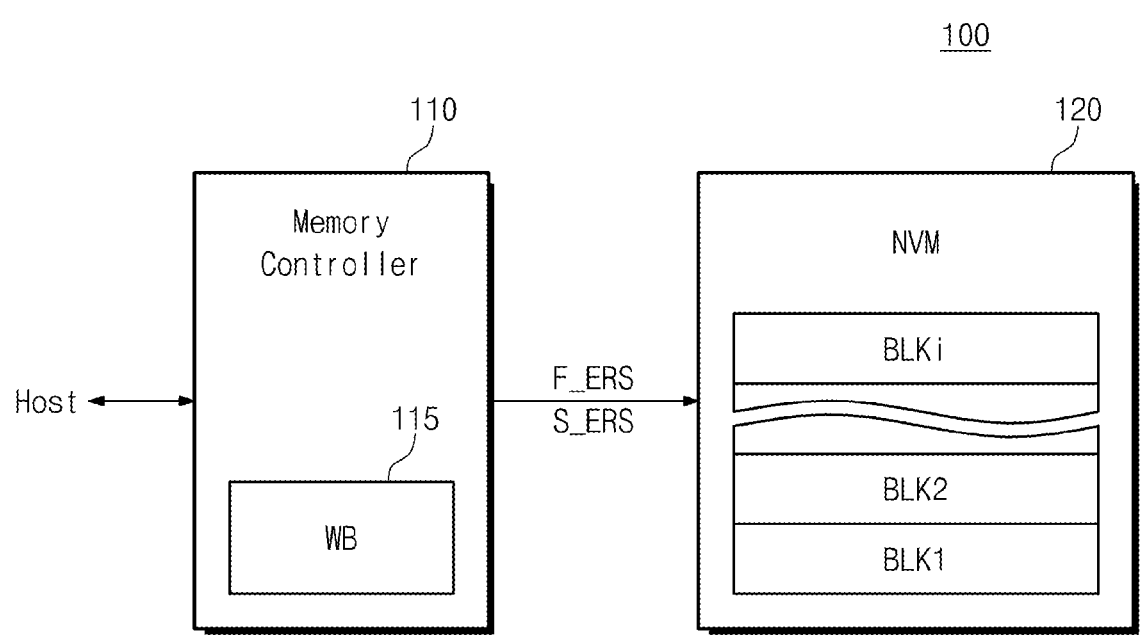
FIG. 1 is a block diagram schematically illustrating a storage device according to at least one example embodiment of the inventive concepts.

Embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the concept of the inventive concepts to those skilled in the art. Accordingly, known processes, elements, and techniques are not described with respect to some of the embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, features and functions of the inventive concepts will be exemplarily described using a NAND flash memory device as a nonvolatile storage medium. However, the inventive concepts are not limited thereto. Also, the storage medium may be formed of other nonvolatile memory devices. For example, the storage medium may be formed of a PRAM, an MRAM, a ReRAM, a FRAM, a NOR flash memory, or the like.

The inventive concepts may be implemented by different embodiments or applied thereto. Further, detailed description may be modified or changed according to viewpoints and applications without escaping from the scope, spirit, and other objects of the inventive concepts. Below, the inventive concepts will be described with reference to accompanying drawings.

FIG. 1 is a block diagram schematically illustrating a storage device according to at least one example embodiment of the inventive concepts. Referring to FIG. 1, a storage device 100 includes a memory controller 110 and a nonvolatile memory device 120. The memory controller 110 controls the nonvolatile memory device 120 to perform an erase mode with a variable speed with respect to a selected memory block.

The memory controller 110 controls the nonvolatile memory device 120 in response to a request of a host. The memory controller 110 interfaces the host with the nonvolatile memory device 120. The memory controller 110 accesses a selected memory block of the nonvolatile memory device 120 in response to a request of the host.

The memory controller 110 erases a memory block of the nonvolatile memory device 120 in response to a write or erase request of the host. For example, the memory controller 110 may erase a selected memory block in response to an erase request that is issued by the host or a memory management operation (e.g., a merge operation or a garbage collection operation). An erase mode selected by the memory controller 110 may be one of a plurality of erase modes with different erase speeds. To write data through a fast erase operation, the memory controller 110 provides the nonvolatile memory device 120 with a fast erase command F_ERS. When a fast erase operation is unnecessary, the memory controller 110 provides the nonvolatile memory device 120 with a slow erase command S_ERS.

Here, there is described an example where a write mode is decided using a command. However, the inventive concepts are not limited thereto. An erase mode about a selected memory block may be decided using a set feature function or other control signals.

The memory controller 110 refers a state of a write buffer 115 to issue an erase command for selecting one of erase modes with different erase speeds. The memory controller 110 decides an erase mode based on the size of data that is to be written at the nonvolatile memory device 120 and stored in the write buffer 115. In the event that a slow erase operation has been performed, the memory controller 110 decides an erase mode based on a result of predicting the case that the write buffer 115 is not overflowed.

In addition, the memory controller 110 determines an erase mode based on a mapping table that a flash translation layer (hereinafter, referred to as FTL) being a sort of firmware manages. For example, the memory controller 110 selects a slow erase mode S_EM when the number of free blocks is sufficient and a fast erase mode F_EM when the number of free blocks is insufficient.

The nonvolatile memory device 120 performs an erase operation, a read operation, and a write operation according to a control of the memory controller 110. The nonvolatile memory device 120 has a plurality of memory blocks BLK1 to BLKi, each of which includes a plurality of memory cells arranged in rows and columns. Each memory block may form an erase unit. The nonvolatile memory device 120 erases a selected memory block in response to an erase command F_ERS or S_ERS from the memory controller 110.

In a slow erase mode, the nonvolatile memory device 120 sets an erase pulse to be provided to a pocket p-well PP-Well to be low and the pulse duration to be long. That is, in the slow erase mode S_EM, to a selected memory block is provided a start pulse with has a low voltage level and a wide pulse width. In contrast, during a fast erase operation, a level of a start pulse increases and its width becomes narrow. A difference between the fast erase mode and the slow erase mode will be more fully described with reference to FIG. 3.

There is described an example where a NAND flash memory is used as a storage medium of the nonvolatile memory device 120. However, the inventive concepts are not limited thereto. For example, the storage medium may be formed of a PRAM, an MRAM, a ReRAM, a FRAM, a NOR flash memory, or the like.

With the storage device 100, when an erase operation is requested, the memory controller 110 issues a command for defining an erase speed of a selected memory block of the nonvolatile memory device 120. In general, a lifetime of a fast erased memory block may be shorter than that of a slowly erased memory block. The memory controller 110 executes the slow erase mode of the inventive concepts in such a way that performance is not affected, thereby reducing deterioration due to an erase operation of the nonvolatile memory device 120. Thus, it is possible to lengthen a lifetime of the nonvolatile memory device 120.

Figure 2:
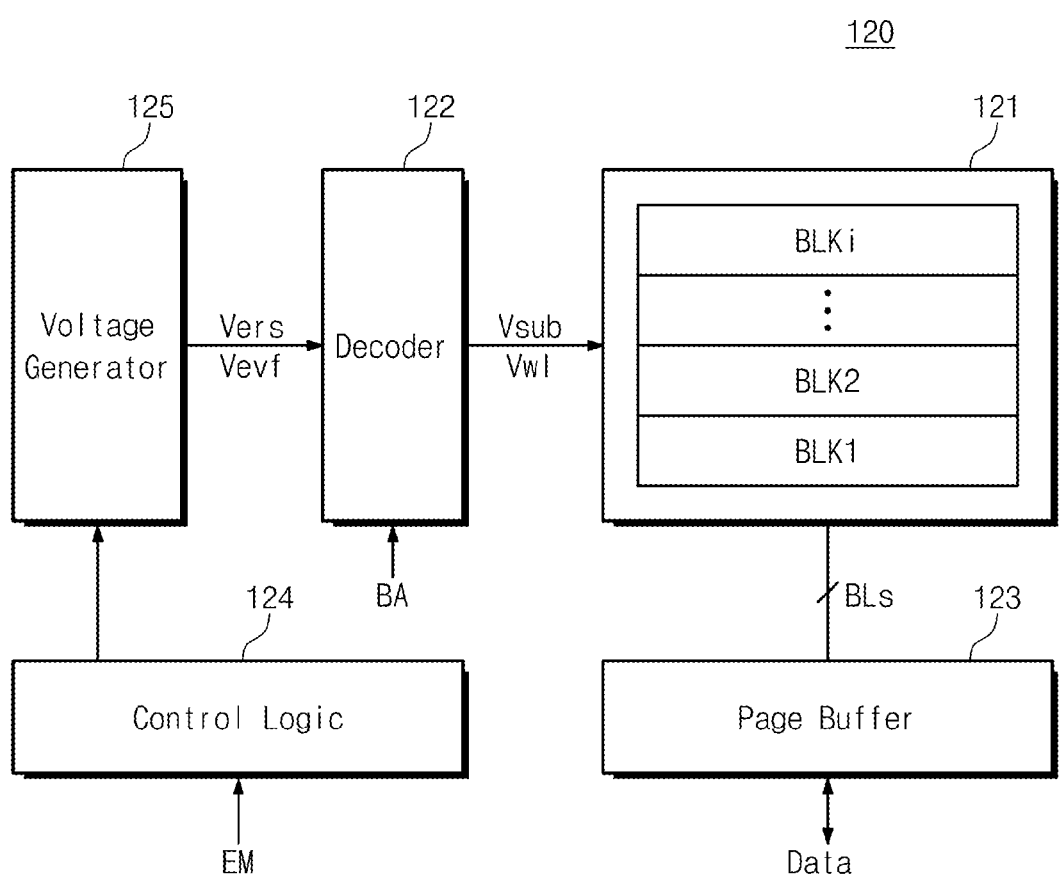
FIG. 2 is a block diagram schematically illustrating a nonvolatile memory device according to at least one example embodiment of the inventive concepts.

FIG. 2 is a block diagram schematically illustrating a nonvolatile memory device according to at least one example embodiment of the inventive concepts. Referring to FIG. 2, a nonvolatile memory device 120 includes a cell array 121, a decoder 122, a page buffer 123, control logic 124, and/or a voltage generator 125.

The cell array 121 is connected to the decoder 122 through word lines and selection lines. The cell array 121 is connected to the page buffer 123 through bit lines. The cell array 121 includes a plurality of memory blocks BLK1 to BLKi, each of which includes a plurality of NAND cell strings. An erase operation may be executed by a memory block unit. During an erase operation, an erase voltage Vers generated from the voltage generator 125 may be provided to a selected memory block of the cell array 121. An erase verification voltage Vevf may be applied to word lines of the selected memory block after supplying of the erase voltage Vers.

In at least one example embodiment, the erase voltage Vers may be changed according to an erase mode EM. For example, in case of a slow erase mode S_EM, a start pulse with a low voltage level and a wide pulse width is provided to a selected memory block. During a fast erase mode F_EM, a level of the start pulse increases and its duration narrows.

The decoder 122 selects one of the memory blocks BLK1 to BLKi of the cell array 121 in response to an address (e.g., a block address). The decoder 122 transfers a voltage corresponding to the fast erase mode F_EM or the slow erase mode S_EM to a word line and a bulk (or, a substrate) of a selected memory block. The Vsub is applied to a bulk or a substrate PP-Well of a memory block.

The page buffer 123 operates as a write driver or as a sense amplifier according to a mode of operation. During a program operation, the page buffer 123 transfers a bit line voltage corresponding to program data to a bit line of the cell array 121. During a read operation, the page buffer 123 may sense data stored in a selected memory cell through a bit line. The page buffer 123 latches the sensed data and outputs the latched data to an external device.

The control logic 124 controls the decoder 122, the page buffer 123, and the voltage generator 125 in response to a command transferred from the external device. The control logic 124 controls the voltage generator 125 to erase a selected memory block according to an erase mode EM provided from the external device.

Under control of the control logic 124, the voltage generator 125 generates various word line voltages to be supplied to word lines and a voltage to be supplied to a bulk (e.g., a well area) where memory cells are formed. The various word line voltages to be supplied to word lines may include a program voltage Vpgm, a pass voltage Vpass, a read voltage Vrd, a pass read voltage Vread, etc. The voltage generator 125 generates selection line voltages to be provided to the selection lines SSL and GSL during a read/program operation.

The voltage generator 125 generates the erase voltage Vers with a variety of levels. The voltage generator 125 changes a width and a level of a start pulse of the erase voltage Vers to be supplied to a bulk of a selected memory block according to the erase mode EM. The voltage generator 125 also generates the erase verification voltage Vevf with a level corresponding to the erase voltage Vers. At the fast erase mode F_EM, the voltage generator 125 produces an erase pulse that is relatively large and relatively narrow. In the slow erase mode S_EM, the voltage generator 125 generates an erase pulse that is relatively small and relatively wide.

The nonvolatile memory device 120 of the inventive concepts varies an erase bias of a selected memory block in response to an erase command including erase speed information provided from a memory controller 110. With this control scheme, it is possible to reduce or minimize erase voltage stress forced to a memory block of the nonvolatile memory device 120. This may mean that a lifetime of the nonvolatile memory device 120 lengthens.

Figure 3:
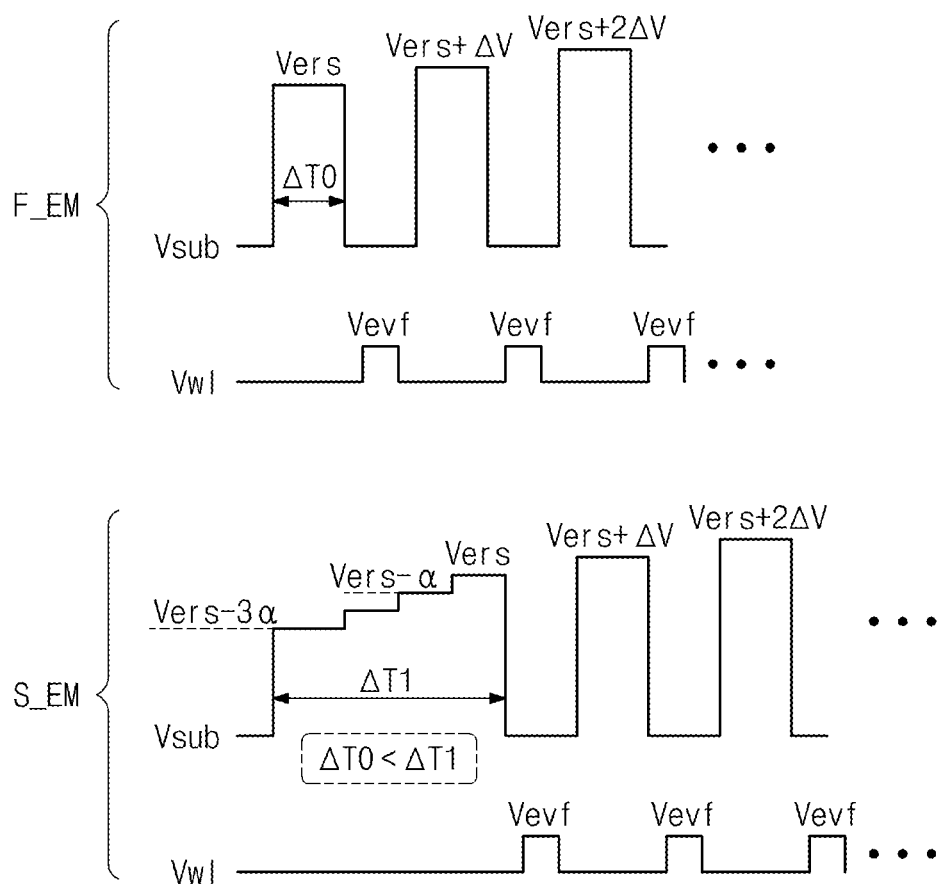
FIG. 3 is a waveform diagram schematically illustrating an example embodiment of an erase mode according to at least one example embodiment of the inventive concepts.

FIG. 3 is a waveform diagram schematically illustrating an example embodiment of an erase mode EM according to at least one example embodiment of the inventive concepts. Referring to FIG. 3, an erase mode EM may be distinguishable according to a level and a pulse width of an erase voltage Vers.

At a fast erase mode F_EM, a selected memory block is erased using an erase start voltage Vers and an erase verification voltage Vevf. It is assumed that an erase pulse is provided in an ISP (Incremental Step Pulse) manner where pluralities of erase loops are iterated until erasing is ended.

The erase start voltage Vers is provided to the selected memory block. The erase start voltage Vers that is applied to a substrate or a pocket p-well of the selected memory block at the fast erase mode F_EM has a pulse level Vers and a pulse width $\Delta T0$. Next, the erase verification voltage Vevf is applied to word lines of the selected memory block. If the erase verification result indicates that one or more memory cells have threshold voltages higher than the erase verification voltage Vevf, an erase operation is again executed using an erase voltage (Vers+$\Delta V$) and an erase verification voltage Vevf. The erase voltage gradually increases, and an erase operation is ended when threshold voltages of all memory cells are small than the erase verification voltage Vevf.

In a slow erase mode S_EM, a selected memory block is erased using an erase start pulse with a pulse level (Vers−3$\alpha$) and the erase verification voltage Vevf. The pulse level (Vers−3$\alpha$) of the erase start pulse used in the slow erase mode S_EM is lower than that at the fast erase mode F_EM. The pulse width $\Delta T0$ of the erase start pulse used in the slow erase mode S_EM is narrower than that $\Delta T1$ at the fast erase mode F_EM.

Further, in the slow erase mode S_EM, a pulse level gradually increases during the pulse duration. The reason is that the erase start pulse must have a voltage level Vers for applying of an increment $\Delta V$ to following erase loops. If the erase start pulse with a relatively high level Vers is applied to the pocket p-well PP-Well, however, the stress forced to an oxide film of a memory cell may increase. Deterioration of an oxide film of a memory cell may be reduced by making the erase start pulse increase from (Vers−3$\alpha$) to the pulse level Vers stepwise or linearly.

Next, the erase verification voltage is provided to word lines of the selected memory block. If the erase verification result indicates that one or more memory cells have threshold voltages higher than the erase verification voltage Vevf, an erase operation is again executed using an erase voltage (Vers+$\Delta V$) and an erase verification voltage Vevf. The erase voltage gradually increases, and an erase operation is ended when threshold voltages of all memory cells are lower than the erase verification voltage Vevf.

Levels of the erase pulse and verification voltage at the fast and slow erase modes F_EM and S_EM are exemplarily described. It is understood that modification or change on the level or width of the erase start pulse in the slow erase mode S_EM is made variously. A width $\Delta T0$ of the erase start pulse in the slow erase mode S_EM may be set to be wider than that $\Delta T1$ at the fast erase mode F_EM. Also, a level (Vers−3$\alpha$) of the erase start pulse in the slow erase mode S_EM may be set to be lower than that Vers at the fast erase mode F_EM.

FIG. 4 is a waveform diagram schematically illustrating a variety of slow erase modes according to at least one example embodiment of the inventive concepts. Referring to FIG. 4, a slow erase mode is divided into a plurality of erase modes according to a width of an erase start pulse. In at least one example embodiment, the slow erase mode S_EM is divided into two or more, for example, three slow erase modes S_EM1 to S_EM3. Below, there may be described only a waveform of an erase voltage Vsub that is to be applied to a bulk or a substrate PP-Well of a memory block, and a waveform of an erase verification voltage Vevf is omitted. In each erase loop, the erase verification voltage Vevf may be provided after the erase voltage Vsub is applied. A waveform of the erase verification voltage Vevf is substantially the same as that shown in FIG. 3.

The first slow erase mode S_EM1 is substantially the same as that described with reference to FIG. 3. That is, in the first slow erase mode S_EM1, a selected memory block is erased using an erase start pulse with a level (Vers−3$\alpha$). The level (Vers−3$\alpha$) of the erase start pulse in the first slow erase mode S_EM1 may be set to be lower than that Vers at the fast erase mode F_EM. A width $\Delta T1$ of the erase start pulse in the first slow erase mode S_EM1 may be set to be wider than that $\Delta T0$ at a fast erase mode F_EM. A pulse level gradually increases during the pulse duration $\Delta T1$ in the first slow erase mode S_EM1.

At the second slow erase mode S_EM2, a selected memory block is erased using an erase start pulse with a level (Vers−4$\alpha$). The level (Vers−4$\alpha$) of the erase start pulse at the second slow erase mode S_EM2 may be set to be lower than that (Vers−3$\alpha$) in the first slow erase mode S_EM1. A width $\Delta T2$ of the erase start pulse at the second slow erase mode S_EM2 may be wider than that $\Delta T1$ in the first slow erase mode S_EM1. A pulse level gradually increases during the pulse duration $\Delta T2$ at the second slow erase mode S_EM2.

At the third slow erase mode S_EM3, a selected memory block is erased using an erase start pulse with a level (Vers−4$\alpha$). The level (Vers−5$\alpha$) of the erase start pulse at the third slow erase mode S_EM3 may be set to be lower than that (Vers−4$\alpha$) at the second slow erase mode S_EM2. A width $\Delta T3$ of the erase start pulse at the third slow erase mode S_EM3 may be wider than that $\Delta T2$ at the second slow erase mode S_EM2. A pulse level gradually increases during the pulse duration $\Delta T3$ at the third slow erase mode S_EM3.

Modification or change of an erase speed may be made variously through a variety of slow erase modes. As describes above, a lifetime of a memory block increases according to a decrease in the erase speed. Thus, a lifetime of a nonvolatile memory device 120 may be lengthened without lowering of performance by using fast and slow erase modes dynamically according to a state of a memory system.

Figure 5:
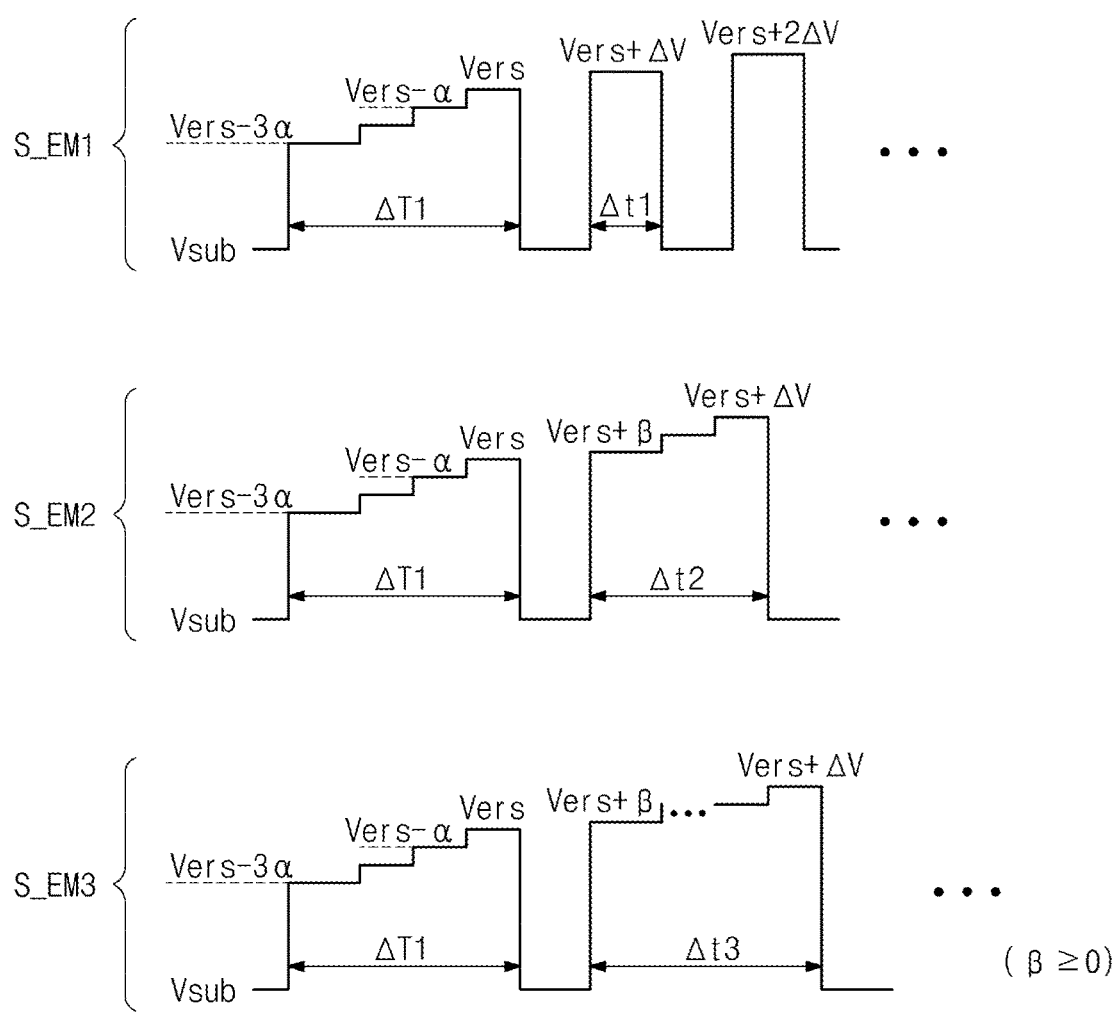
FIG. 5 is a waveform diagram schematically illustrating a variety of slow erase modes according to at least one example embodiment of the inventive concepts.

FIG. 5 is a waveform diagram schematically illustrating a variety of slow erase modes according to at least one example embodiment of the inventive concepts. Referring to FIG. 5, a slow erase mode is divided into a plurality of erase modes according to waveforms of the remaining erase pulses other than an erase start pulse. Widths and levels of erase start pulses are set to be identical to one another.

A first slow erase mode S_EM1 is substantially the same as a slow erase mode S_EM described with reference to FIG. 3. That is, in the first slow erase mode S_EM1, a selected memory block is erased using an erase start pulse with a level (Vers−3α). The level (Vers−3α) of the erase start pulse in the first slow erase mode S_EM1 may be set to be lower than that Vers at the fast erase mode F_EM. A width ΔT1 of the erase start pulse in the first slow erase mode S_EM1 may be set to be wider than that ΔT0 at a fast erase mode F_EM. A pulse level gradually increases during the pulse duration ΔT1 in the first slow erase mode S_EM1. Also, in the first slow erase mode S_EM1, a second erase pulse provided following the erase start pulse has a width Δt1 and a level (Vers−ΔV).

A waveform of an erase start pulse of a second slow erase mode S_EM2 is substantially the same as that in the first slow erase mode S_EM1. However, at the second slow erase mode S_EM2, a second erase pulse has a start level (Vers+β) and a width Δt2 wider than the width Δt1. Thus, there increases a time taken to provide a second erase pulse to a bulk of a memory block. This may mean that an erase time at the second slow erase mode S_EM2 is longer than that in the first slow erase mode S_EM1.

A waveform of an erase start pulse of a third slow erase mode S_EM3 is substantially the same as that at the second slow erase mode S_EM2. However, at the third slow erase mode S_EM3, a second erase pulse has a start level (Vers+β) and a width Δt3 wider than the width Δt2. Thus, there increases a time taken to provide a second erase pulse to a bulk of a memory block. This may mean that an erase time at the third slow erase mode S_EM3 is longer than that at the second slow erase mode S_EM2.

In FIGS. 4 and 5, a variety of slow erase modes are exemplarily described. However, the inventive concepts are not limited thereto. Modification or change on the slow erase modes may be made variously.

Figure 6:
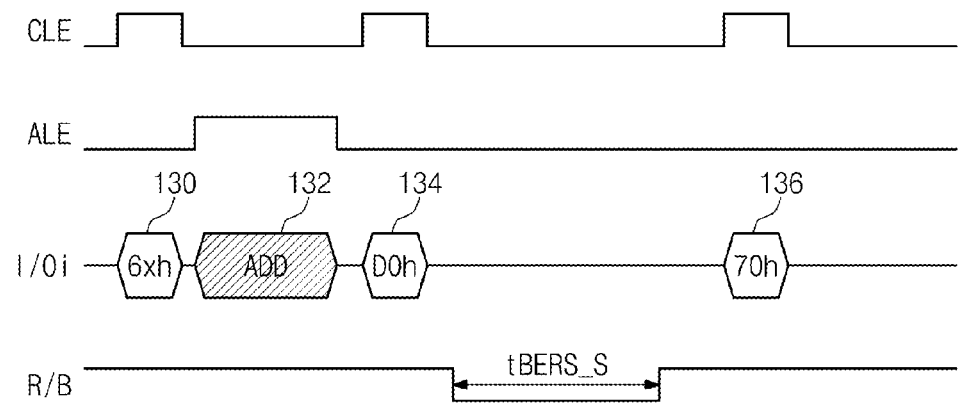
FIG. 6 is a diagram schematically illustrating an example slow erase command sequence provided to a nonvolatile memory device shown in FIG. 2.

FIG. 6 is a diagram schematically illustrating a slow erase command sequence provided to a nonvolatile memory device shown in FIG. 2. Referring to FIG. 6, a slow erase command S_ERS is provided to control terminals CLE, ALE, and R/B and input/output terminals I/Oi of a nonvolatile memory device 120.

The nonvolatile memory device 120 receives a command set (6xh) 130 corresponding to the slow erase command S_ERS during a high period of a command latch enable signal CLE. During the high period of the control terminal ALE, there is received a block address 132 of a memory block to be erased at the slow erase mode S_EM. The nonvolatile memory device 120 receives the block address 132 during an address input cycle. In at least one example embodiment, a command set 60h may be received for a fast erase operation. A value of the command set (6xh) 130 may be variously changed to designate one of a plurality of slow erase modes.

Following the address, a command set (D0h) 134 that designates confirmation of the slow erase command is received during a high period of the command latch enable signal CLE. If the command set 134 is received, the nonvolatile memory device 120 erases a selected memory block according to the slow erase mode. A time taken to erase the selected memory block according to the slow erase mode is an erase time tBERS_S corresponding to a low period of a ready/busy signal R/B. A time taken to erase a memory block at the slow erase mode may be longer than a time taken to erase a memory block at a fast erase mode. During a high period of the ready/busy signal R/B, a command set (70h) 136 is provided from a memory controller 110 to check a state of the nonvolatile memory device 120.

Figure 7:
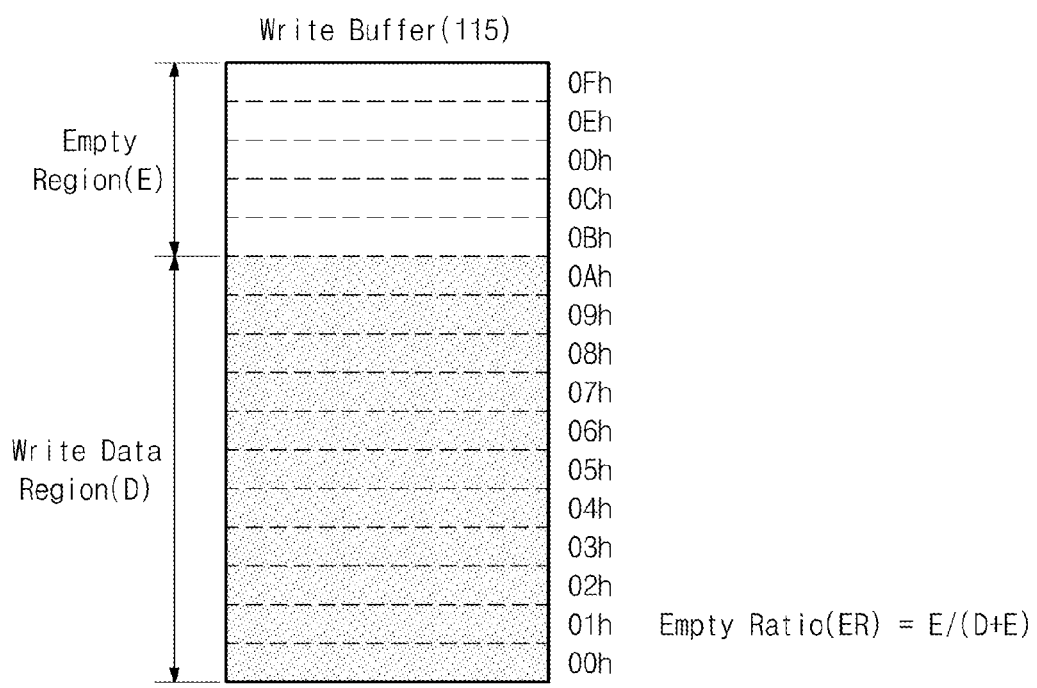
FIG. 7 is a diagram schematically illustrating a write buffer according to at least one example embodiment of the inventive concepts.

FIG. 7 is a diagram schematically illustrating a write buffer according to at least one example embodiment of the inventive concepts. Referring to FIG. 7, a write buffer 115 that is provided in a memory controller 110 shown in FIG. 1 may be implemented with a variety of random access memories. In a solid state drive (SSD), a high-capacity DRAM may be used as the write buffer 115. In contrast, it is difficult to implement a high-capacity write buffer 115 in a low-power and small-sized memory card, such as a mobile card or an embedded multimedia card (eMMC). However, a write buffer of the inventive concepts is applicable to all memory systems without capacity limit.

The write buffer 115 has an address space ranging from a start address 00h to the last address 0Fh. Write data may be written on a memory randomly or sequentially. It is assumed that data has been written at a memory space of the write buffer 115 that is defined by the start address 00h and an address 0Ah. Also, it is assumed that a memory space of the write buffer 115 defined by addresses 0Bh and 0Fh are empty.

Below, the size of a data area where data has been written is referred to as a data size D, and the size of an empty area is referred to as "E". In this case, it is possible to indicate a state of the write buffer 115 using an empty ratio (ER). That is, the empty ratio ER means a ratio of an empty memory size to the whole memory size (E+D). Thus, the empty ratio ER is expressed by E/(E+D).

That the empty ratio ER is great means that the amount of data to be written at a nonvolatile memory device 120 is small. This also means that a little of memory blocks are erased to write data. Thus, probability that a decrease in performance does not occur although a memory block is erased using a slow erase mode may be high. In contrast, that the empty ratio ER is small means that the amount of data to be written at the nonvolatile memory device 120 is great. This means that it is necessary to prepare a memory block erased via a fast erase operation to write a large number of data at the nonvolatile memory device 120. If a memory block is erased at different erase speeds according to the empty ratio ER, a lifetime of a memory block may be lengthened without a decrease in performance.

Further, a status of the write buffer 115 may be variously provided. A result of determining whether or not a pattern of a logical address LBA of data input in the write buffer 115 is random or successional may be used as a status of the write buffer 115. Since random data is frequently updated on the write buffer 115, it is unnecessary to prepare an erased block urgently. In contrast, probability that continuative data is sequentially written at the write buffer 115 and is immediately programmed at the nonvolatile memory device 120 may be high. Thus, it is necessary to prepare an erased memory block urgently. An erase mode of the inventive concepts may be determined based on a ratio of data with a random pattern to data with a continuing pattern.

Figure 8:
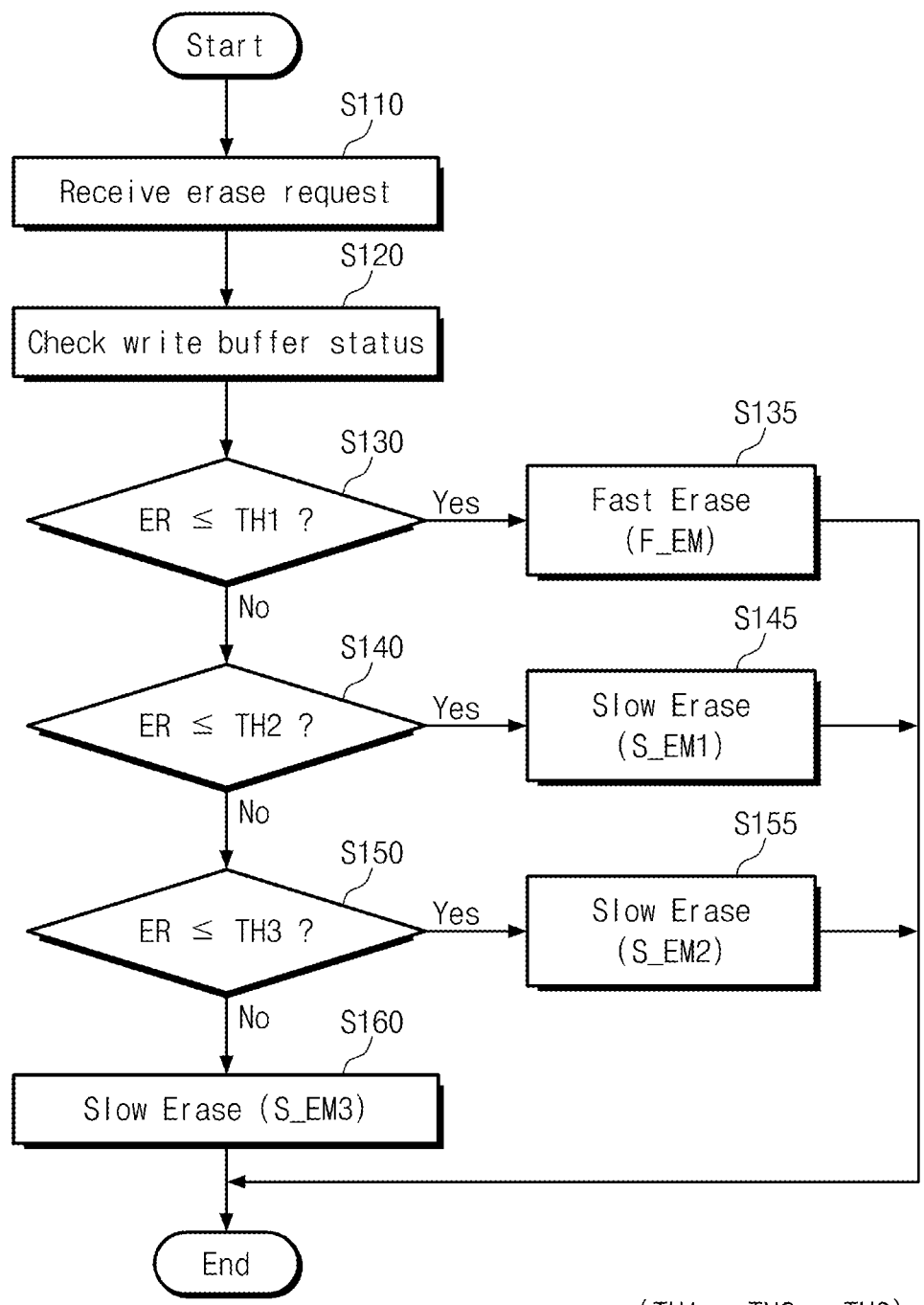
FIG. 8 is a flow chart schematically illustrating an erase method according to at least one example embodiment of the inventive concepts.

FIG. 8 is a flow chart schematically illustrating an erase method according to at least one example embodiment of the inventive concepts. A method of determining an erase mode according to an empty ratio ER will be more fully described with reference to FIG. 8.

In operation S110, a memory controller 110 receives an erase request. The erase request may be designated by a host, but it may be issued by an internal operation of the memory controller 110. For example, the erase request may be triggered by a garbage collection or merge operation.

In operation S120, the memory controller 110 checks a status of a write buffer 115. For example, the memory controller 110 may calculate an empty ratio ER based on a data capacity of the write buffer 115.

In operation S130, the memory controller 110 compares the empty ratio ER with a first threshold value TH1. If the empty ratio ER is less than or equal to the first threshold value TH1, the method proceeds to operation S135. In contrast, if the empty ratio ER is greater than the first threshold value TH1, the method proceeds to operation S140.

In operation S135, the memory controller 110 selects a fast erase mode F_EM as an erase mode about a selected memory block. That the empty ratio ER is small means that a large amount of data is programmed at the write buffer 115.

In operation S140, the memory controller 110 determines whether or not the empty ratio ER is greater than the first threshold value TH1 and less than or equal to a second threshold value TH2. If the empty ratio ER is smaller than the second threshold value TH2, the method proceeds to operation S145. In contrast, if the empty ratio ER is greater than the second threshold value TH2, the method proceeds to operation S150. In operation S145, the memory controller 110 selects a first slow erase mode S_EM1 as an erase mode about the selected memory block.

In operation S150, the memory controller 110 determines whether the empty ratio ER is greater than the second threshold value TH2 and less than or equal to a third threshold value TH3. If the empty ratio ER is smaller than the third threshold value TH3, the method proceeds to operation S155. In contrast, if the empty ratio ER is greater than the third threshold value TH3, the method proceeds to operation S160. In step S155, the memory controller 110 selects a second slow erase mode S_EM2 as an erase mode about the selected memory block. In operation S160, the memory controller 110 selects a third slow erase mode S_EM3 as an erase mode about the selected memory block.

There has been described a method of determining an erase mode according to the empty ratio ER. An erase mode F_EM/S_EMi may be directly related to the stress a memory block selected for erasing substantially experiences. That is, if an erase operation is executed according to a status of the write buffer 115, memory blocks may be erased using a slow erase mode S_EMi, thereby lengthening their lifetime.

Figure 9:
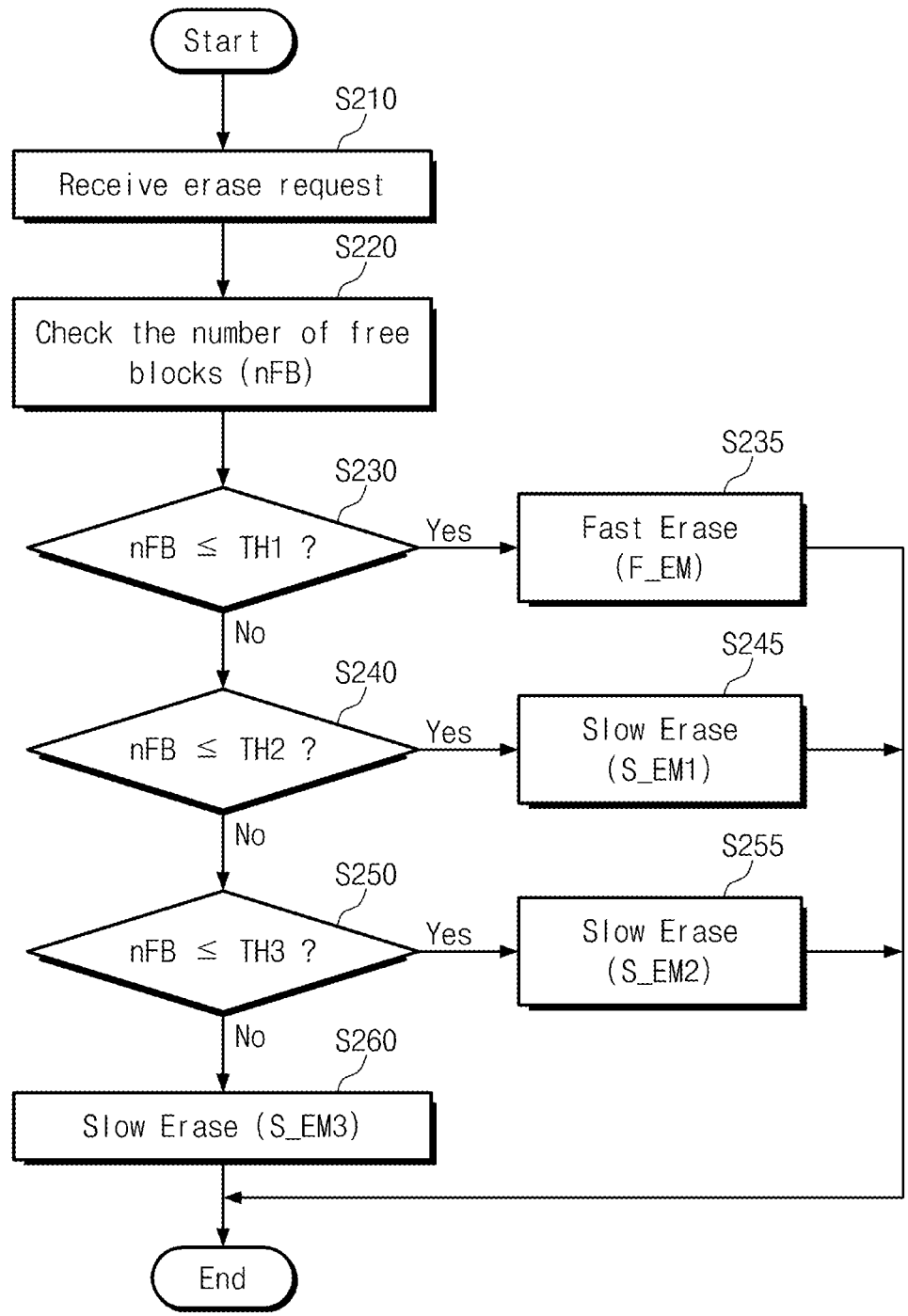
FIG. 9 is a flow chart schematically illustrating an erase method according to at least one example embodiment of the inventive concepts.

FIG. 9 is a flow chart schematically illustrating an erase method according to at least one example embodiment of the inventive concepts. A method of determining an erase mode according to the number of free blocks will be more fully described with reference to FIG. 9.

In operation S210, a memory controller 110 receives an erase request. The erase request may be designated by a host, but it may be issued by an internal operation of the memory controller 110.

In operation S220, the memory controller 110 checks the number nFB of free blocks at which write-requested data of a host is to be written. The write-requested data may be stored in a log block selected from free blocks. If the number nFB of free blocks is sufficient, it is unnecessary to generate additional free blocks using a merge operation. In contrast, if the number nFB of free blocks is insufficient, it is necessary to generate free blocks through a fast erase operation. It is possible to check the number nFB of free blocks by searching an address mapping table of the memory controller 110.

In operation S230, the memory controller 110 determines whether or not the number nFB of free blocks is less than or equal to a first threshold value TH1. If the number nFB of free blocks is greater than the first threshold value TH1, the method proceeds to operation S240. In contrast, if the number nFB of free blocks is less than or equal to the first threshold value TH1, the method proceeds to operation S235.

In operation S235, the memory controller controls a nonvolatile memory device 120 to erase a selected memory block according to a fast erase mode F_EM.

In operation S240, the memory controller 110 determines whether or not the number nFB of free blocks is greater than the first threshold value TH1 and less than or equal to a second threshold value TH2. If the number nFB of free blocks is greater than the second threshold value TH2, the method proceeds to operation S250. In contrast, if the number nFB of free blocks is greater than the first threshold value TH1 and less than or equal to the second threshold value TH2, the method proceeds to operation S245. In operation S245, the memory controller controls the nonvolatile memory device 120 to erase a selected memory block according to a first slow erase mode S_EM1.

In operation S250, the memory controller 110 determines whether or not the number nFB of free blocks is greater than the second threshold value TH2 and less than or equal to a third threshold value TH3. If the number nFB of free blocks is greater than the third threshold value TH3, the method proceeds to operation S260. In contrast, if the number nFB of free blocks is greater than the second threshold value TH2 and less than or equal to the third threshold value TH3, the method proceeds to operation S255.

In operation S255, the memory controller 110 selects a second slow erase mode S_EM2 as an erase mode about the selected memory block. In operation S260, the memory controller 110 selects a third slow erase mode S_EM3 as an erase mode about the selected memory block.

A method of determining an erase mode according to the number of free blocks has been described. In the event that the number of free blocks is insufficient, a relatively fast erase mode is selected to prepare free blocks quickly.

Figure 10:
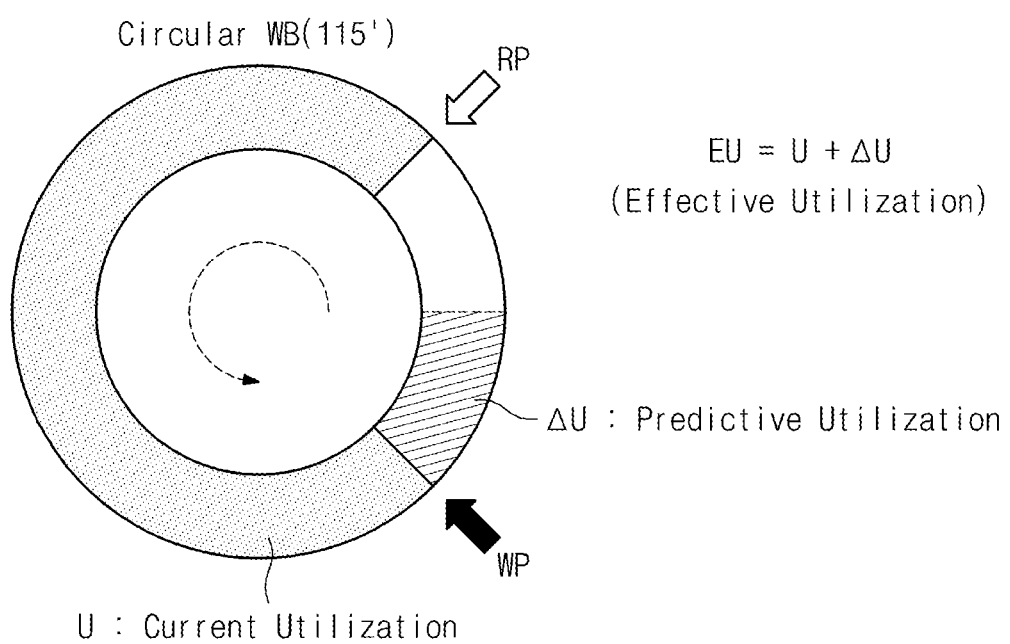
FIG. 10 is a diagram schematically illustrating an example write buffer of the inventive concepts formed of a circular buffer.

FIG. 10 is a diagram schematically illustrating a write buffer of the inventive concepts formed of a circular buffer. Referring to FIG. 10, a write buffer 115' may be formed of a circular buffer where data input and output are modeled by a read pointer RP and a write pointer WP. In at least one example embodiment, a memory address 00h to 0Fh is simplified for ease of description.

A write operation of the write buffer 115' is first triggered at an address 00h. If write data is pushed, a write pointer WP corresponding to a write location increases. If write data is continuously pushed, the write pointer WP may increase up to 0Fh from 00h. When the write pointer WP increases at 0Fh, it returns to 00h and then increases. However, the read pointer RP increases according to a pop-out request, regardless of an increase in the write pointer WP.

In the write buffer 115' with the circular buffer structure, a memory controller 110 determines an erase mode based on buffer utilization. That is, since write and read pointers WP and RP and the amount of data accumulated on the write buffer 115' upon using of a slow erase mode (e.g., a first slow erase mode S_EM1) are predicted, it is possible to determine a slow erase mode to be applied. That is, an erase mode is selected using effective utilization EU of the write buffer 115'.

The effective utilization EU may be (U+ΔU): U indicates current utilization of the write buffer 115' and ΔU indicates predictive utilization that will increase when a slow erase mode S_EM1 is applied. If EU is over 100%, it is impossible to use a slow erase mode. In contrast, when EU is below 100%, it is possible to use a slow erase mode. Also, it is possible to select a plurality of slow erase modes S_EMi according to a level of the effective utilization EU.

Figure 11:
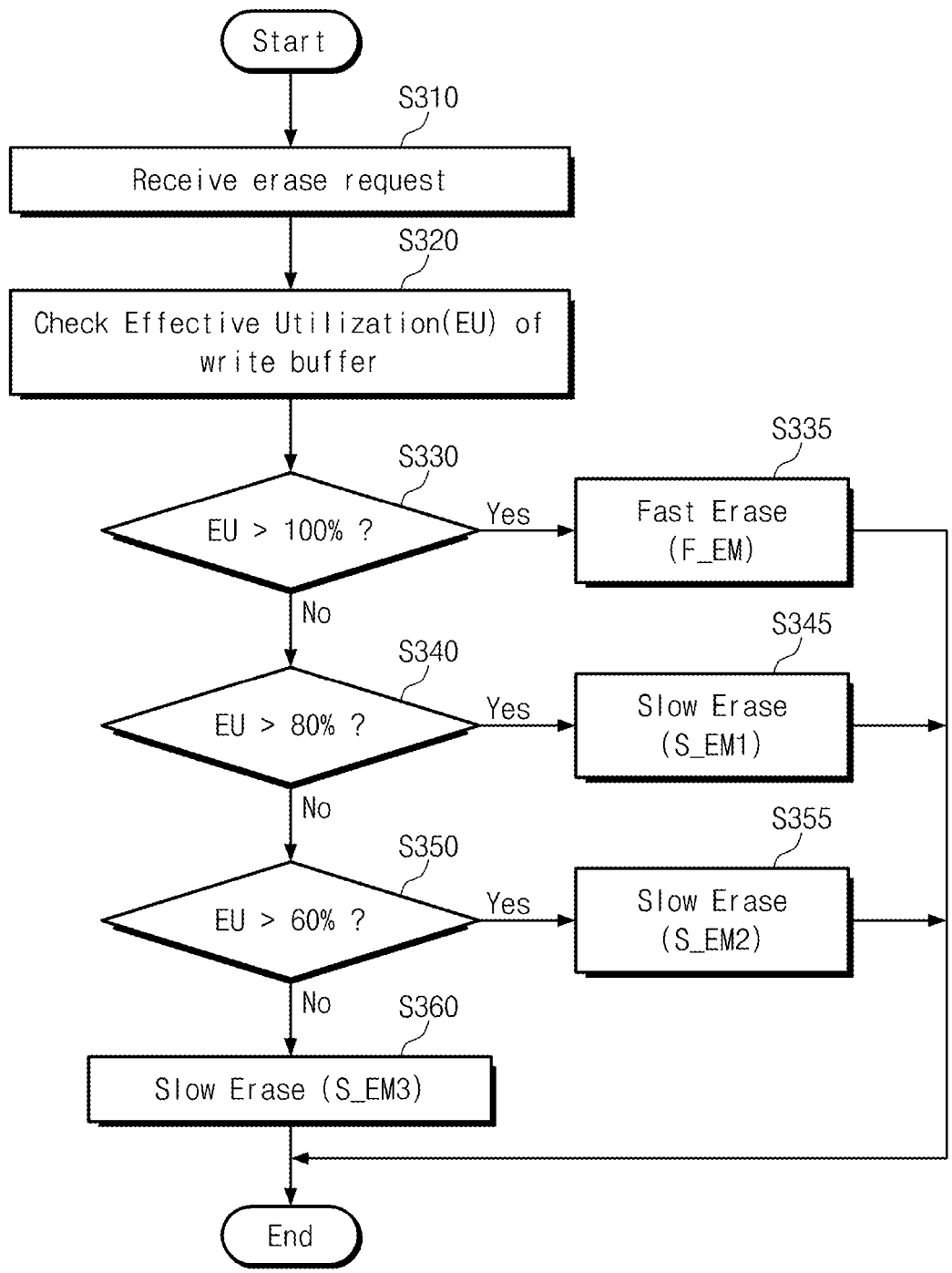
FIG. 11 is a flow chart schematically illustrating an erase method according to at least one example embodiment of the inventive concepts.

FIG. 11 is a flow chart schematically illustrating an erase method according to at least one example embodiment of the inventive concepts. A method of determining a variety of erase modes according to a level of effective utilization EU will be more fully described with reference to FIG. 11.

In operation S310, a memory controller 110 receives an erase request. The erase request may be designated by a host, but it may be issued by an internal operation of the memory controller 110.

In operation S320, the memory controller 110 calculates effective utilization EU of a write buffer 115' formed of a circular buffer. That is, the memory controller 110 calculates the effective utilization EU by summing current utilization U and predictive utilization ΔU. An erase mode applied to calculate the effective utilization EU is not limited to a specific one of first to third slow erase modes. For ease of description, the first erase mode S_EM1 may be applied to calculate the effective utilization EU.

In operation S330, the memory controller 110 determines whether or not the effective utilization EU is over 100%. If the effective utilization EU is not over 100%, the method proceeds to operation S340. If the effective utilization EU is over 100%, the method proceeds to operation S335. In operation S335, the memory controller controls a nonvolatile memory device 120 to erase a selected memory block according to a fast erase mode F_EM.

In operation S340, the memory controller 110 determines whether or not the effective utilization EU is over 80%. If the effective utilization EU is not over 80%, the method proceeds to operation S350. If the effective utilization EU is over 80%, the method proceeds to operation S345. In operation S345, the memory controller controls the nonvolatile memory device 120 to erase a selected memory block according to a first slow erase mode S_EM1.

In operation S350, the memory controller 110 determines whether or not the effective utilization EU is over 60%. If the effective utilization EU is not over 60%, the method proceeds to operation S360. If the effective utilization EU is over 60%, the method proceeds to operation S355. In operation S355, the memory controller controls the nonvolatile memory device 120 to erase a selected memory block according to a second slow erase mode S_EM2.

In operation S360, the memory controller controls the nonvolatile memory device 120 to erase a selected memory block according to a third slow erase mode S_EM3.

There has been described a method of selecting an erase mode using effective utilization EU as an example of a status of a write buffer 115.

Figure 12:
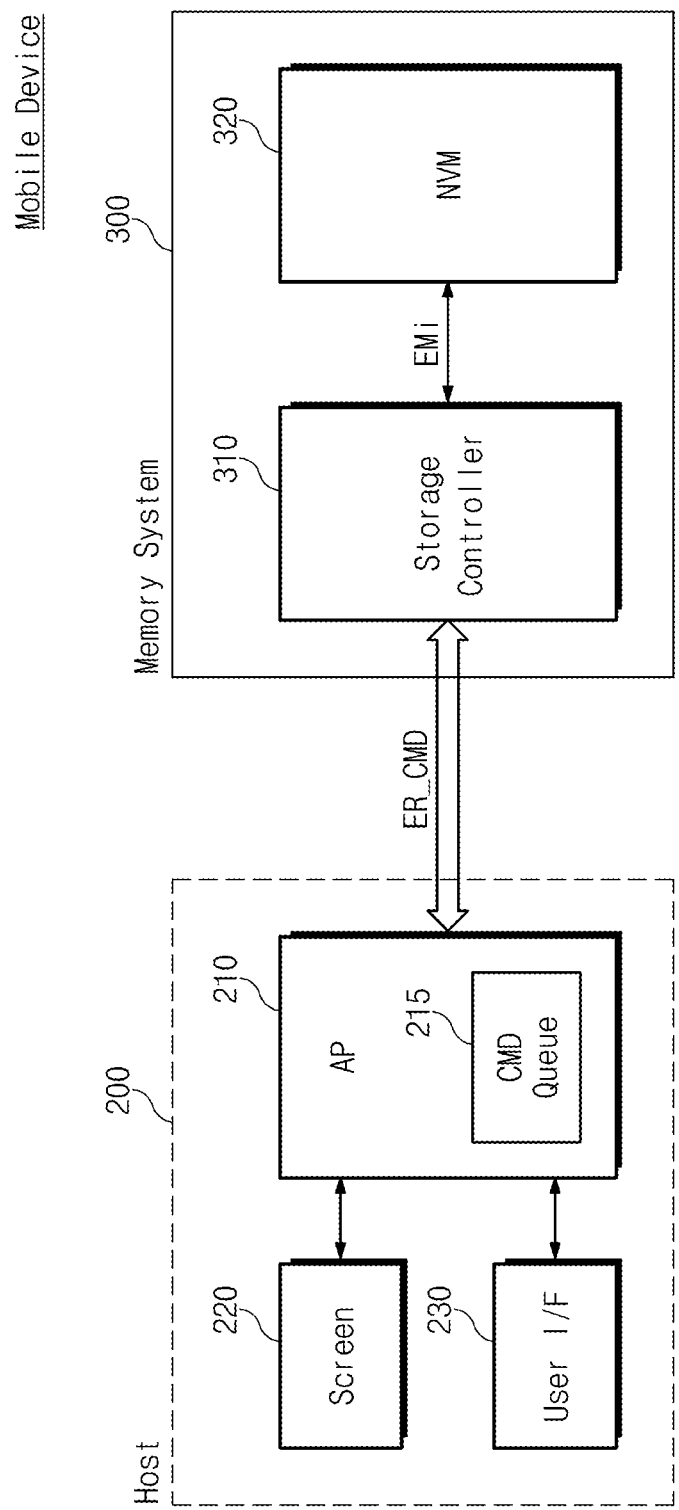
FIG. 12 is a block diagram schematically illustrating a mobile device according to at least one example embodiment of the inventive concepts.

FIG. 12 is a block diagram schematically illustrating a mobile device according to at least one example embodiment of the inventive concepts. Referring to FIG. 12, a mobile device according to the inventive concepts includes a host 200 and a memory system 300. The host 200 contains an application processor 210, a screen 220, and a user interface 230. The memory system 300 comprises a storage controller 310 and a nonvolatile memory device 320.

The application processor 210 drives an application program, an operating system, a device driver, etc. on the host 200. The application processor 210 issues an erase command ER_CMD indicating an erase speed to the memory system 300. In the event that the screen 220 is off, for extension of a lifetime of a memory, the application processor 210 provides the memory system 300 with the erase command ER_CMD such that a memory block is erased according to one of first to third slow erase modes. A status of the screen 220 may be determined by the user interface 230 that is formed of a touch pad. In addition, based on a status of a command queue in the application processor 210, the application processor 210 provides the memory system 300 with the erase command ER_CMD for designating an erase speed.

When the erase command ER_CMD for designating an erase speed is received, the storage controller 310 erases the nonvolatile memory device 320 by an erase mode EMi. The storage controller 310 may issue an erase command, corresponding to one of fast and slow erase modes F_EM and S_EM1 to S_EM3, to the nonvolatile memory device 320.

The nonvolatile memory device 320 may be a storage medium of the memory system 300. For example, the nonvolatile memory device 320 is formed of a NAND flash memory. Or, the nonvolatile memory device 320 may be formed of next-generation nonvolatile memories, such as PRAM, MRAM, ReRAM, FRAM, and so on, or a NOR flash memory.

With the above description, in the mobile device of the inventive concepts, the host 200 provides the memory system 300 with a command for designating an erase mode, based on whether a screen is turned off. That is, an erase mode may be decided by the host 200, not the storage controller 310. As an erase mode is controlled according to a variety of situations of the host 200, a variety of erase modes with different speeds may be applied to the nonvolatile memory device 320. Thus, it is possible to lengthen a lifetime.

Figure 13:
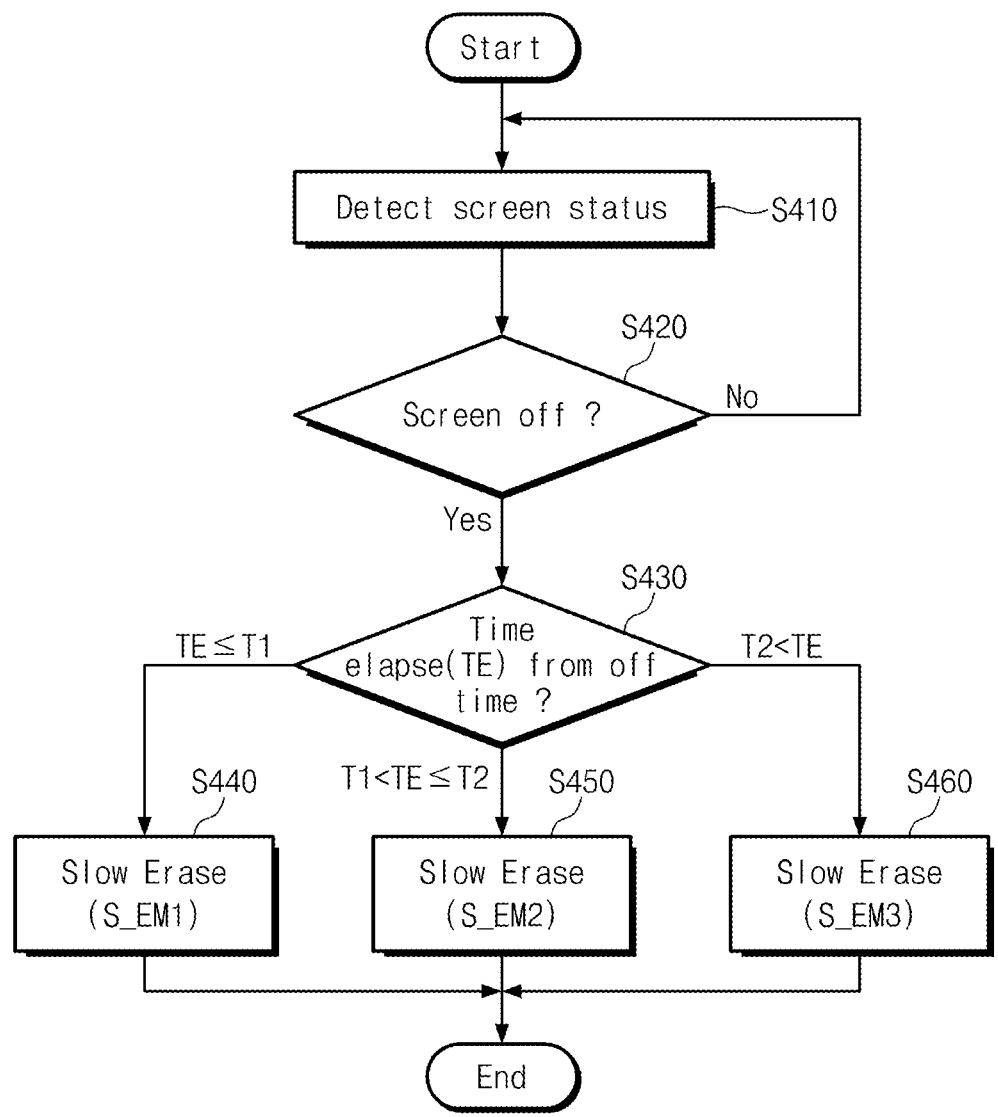
FIG. 13 is a flow chart schematically illustrating an erase method according to at least one example embodiment of the inventive concepts.

FIG. 13 is a flow chart schematically illustrating an erase method according to at least one example embodiment of the inventive concepts. Referring to FIG. 13, a host 200 decides an erase mode based on a status of a screen 220 of a mobile device or user-input information detected by a user interface 230 of the mobile device and transfers an erase mode ER_CMD to a memory system 300.

In operation S410, an application processor 210 detects a status of the screen 220. The application processor 210 checks whether or not the screen 220 is at an off state and whether or not modes such as a power saving mode, a screen protection mode, and so on are executed. That is, the application processor 210 detects such a condition that a user does not feel inconvenience with a slow erase mode executed.

In operation S420, the application processor 210 determines whether or not the screen 220 is at an off state. Screen-on may mean that an image is expressed on the screen 220, and screen-off may mean that an image is not expressed on the screen 220. In the event that the screen 220 is at an off state, the method proceeds to operation S410; when the screen 220 is at an off state, the method proceeds to operation S430.

In operation S430, the application processor 210 monitors an elapse TE from a point in time when the screen 220 becomes off. When TE≤T1 (T1 being a first reference time), the method proceeds to operation S440. If T1<TE≤T2 (T2 being a second reference time), the method proceeds to operation S450. The method proceeds to operation S460 when T2<TE.

In operation S440, the application processor 210 provides an erase command to the memory system 300 such that a selected memory block is erased according to a first slow erase mode S_EM1.

In operation S450, the application processor 210 provides an erase command to the memory system 300 such that a selected memory block is erased according to a second slow erase mode S_EM2.

In operation S460, the application processor 210 provides an erase command to the memory system 300 such that a selected memory block is erased according to a third slow erase mode S_EM3.

Advantages of the inventive concepts have been described using, for example, an on/off state of the screen 220. However, the inventive concepts are not limited thereto. For example, instead of the on/off state of the screen 220, there may be used a screen protection mode, a screen lock mode, a power saving mode, whether pupils of a user watch the screen 220, whether or not a running foreground application is associated with a response to a user, and so on.

Figure 14:
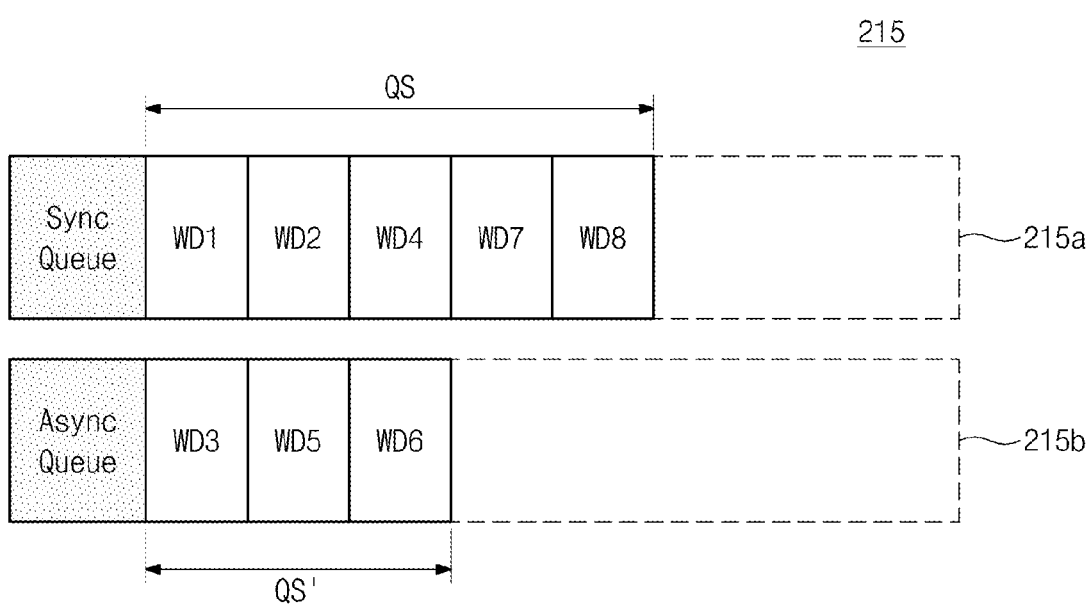
FIG. 14 is a diagram schematically illustrating an example command queue shown in FIG. 12.

FIG. 14 is a diagram schematically illustrating a command queue shown in FIG. 12. Referring to FIG. 14, a command queue 215 may be divided into a synchronous queue 215a and an asynchronous queue 215b for management.

If a write request to the command queue 215 is generated, a scheduler of an application processor 210 classifies data as the synchronous queue 215a or the asynchronous queue 215b according to a characteristic of a write request. The synchronous queue 215a may be used to store write data that causes a decrease in performance when a fast write operation is not performed. For example, write data WD1, WD2, WD4, WD7, and WD8 may be classified as the synchronous queue 215a.

The asynchronous queue 215b may be used to store write data that does not cause a decrease in performance when a fast write operation is not performed. For example, write data WD3, WD5, and WD6 may be classified as the asynchronous queue 215b.

The application processor 210 of the inventive concepts detects information about a queue size QS. The application processor 210 transfers an erase command ER_CMD to a memory system 300 based on a queue size QS of data accumulated on the synchronous queue 215a and a queue size QS' of data accumulated on the asynchronous queue 215b. In at least one example embodiment, the erase command ER_CMD includes information about a slow erase mode or a fast erase mode.

The application processor 210 determines an erase mode about memory blocks based on the queue size QS of the synchronous queue 215a. That is, in the event that a synchronous queue size QS to be written at the memory system 300 is large, the application processor 210 controls the memory system 300 such that a memory block is erased according to a fast erase mode F_EM. In contrast, in the event that a synchronous queue size QS to be written at the memory system 300 is small, the application processor 210 selects a slow erase mode S_EMi.

Figure 15:
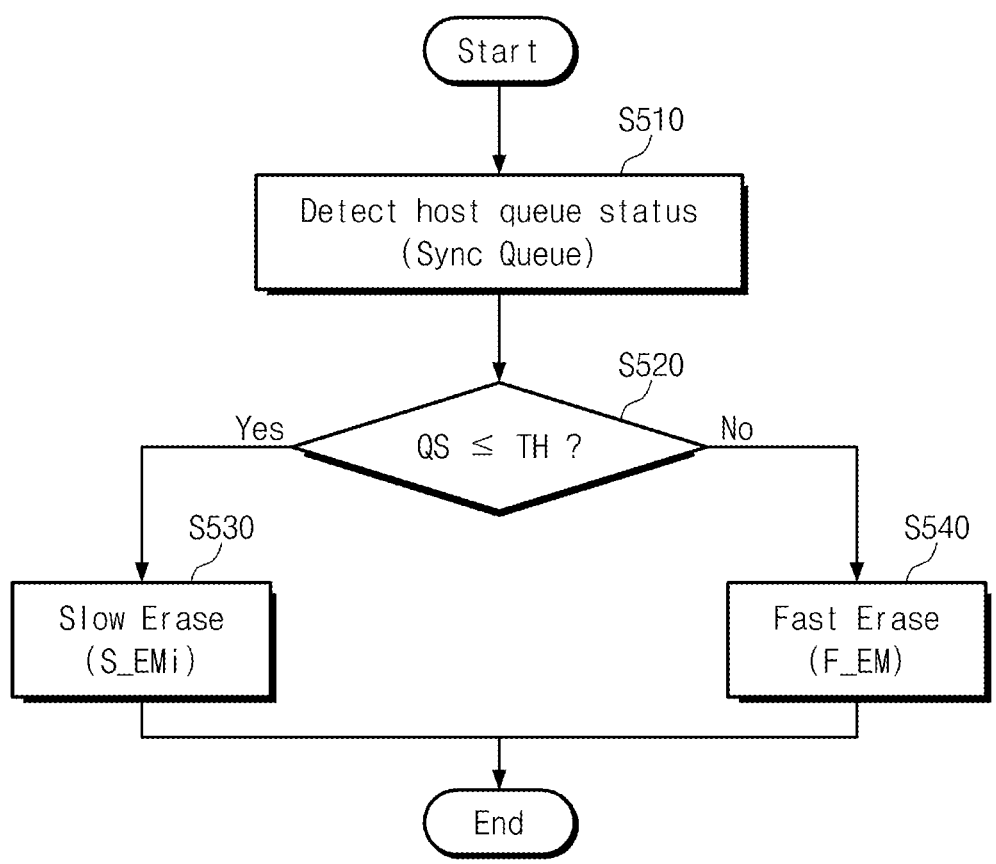
FIG. 15 is a flow chart schematically illustrating an erase method according to at least one example embodiment of the inventive concepts.

FIG. 15 is a flow chart schematically illustrating an erase method according to at least one example embodiment of the inventive concepts. A method of determining an erase mode based on the size of synchronous queue QS will be more fully described with reference to FIG. 15.

In operation S510, an application processor 210 is provided with information about the size of synchronous queue QS that is currently managed in a command queue 215. The application processor 210 detects the size of synchronous queue QS.

In operation S520, the application processor 210 determines whether or not the size of synchronous queue QS is less than or equal to a threshold value TH. When the size of synchronous queue QS is less than or equal to the threshold value TH, the method proceeds to operation S530. If the size of synchronous queue QS is greater than the threshold value TH, the method proceeds to operation S540.

In operation S530, the application processor 210 provides the memory system 300 with an erase command ER_CMD such that a memory block is erased according to a slow erase mode S_EMi. In operation S540, the application processor 210 provides the memory system 300 with an erase command ER_CMD such that a memory block is erased according to a fast erase mode F_EM.

There have been described example embodiments where an erase mode is determined according to a status of a host 200. However, the inventive concepts are not limited thereto. For example, it is understood that an erase command is issued based on various statuses of the host to perform a slow erase operation without a decrease in performance.

Figure 16:
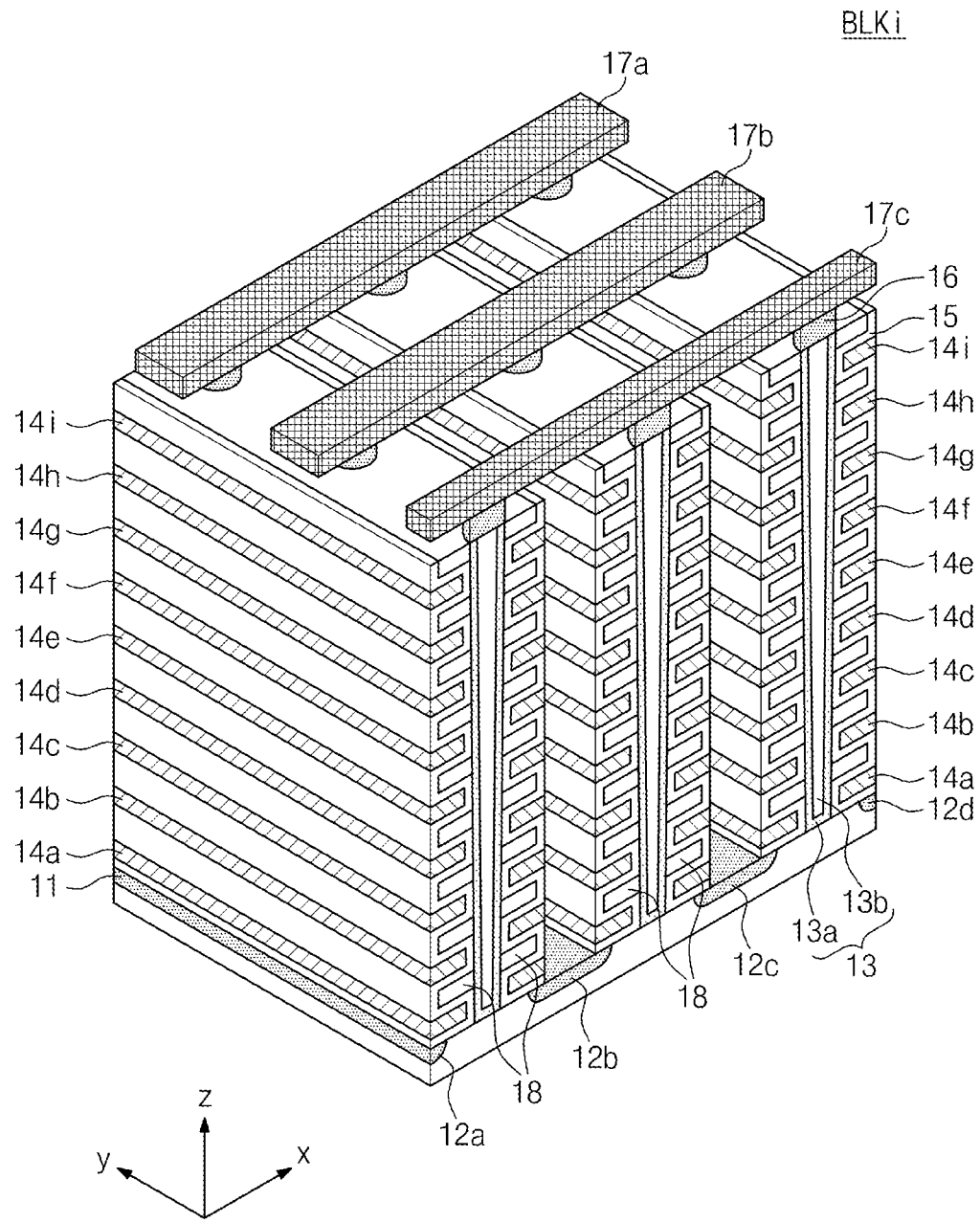
FIG. 16 is a perspective view of a three-dimensional memory block according to at least one example embodiment of the inventive concepts.

FIG. 16 is a perspective view of a three-dimensional memory block according to at least one example embodiment of the inventive concepts. Referring to FIG. 16, a memory block BLKi includes structures extending along a plurality of directions x, y, and z.

On a substrate 11, a plurality of doping areas 12a, 12b, 12c, and 12d are formed along the x-direction. On the substrate 11 between the first and second doping areas 12a and 12b, a plurality of insulation materials 18 that extends along the y-direction are sequentially provided along the z-direction. For example, the insulation materials 18 may be spaced apart from one another along the z-direction.

On the substrate 11 between the first and second doping areas 12a and 12b are formed a plurality of pillars that are sequentially disposed along the y-direction and penetrates the insulation materials 18 along the z-direction. The pillars 13 may be in contact with the substrate 11 through the insulation materials 18. In at least one example embodiment, the pillars 13 may be formed on the substrate 11 between the second and third doping areas 12b and 12c and on the substrate 11 between the third and fourth doping areas 12c and 12d.

In each pillar 13, a surface layer 13a includes a silicon material having the same type as the substrate 11, and an internal layer 13b is formed of an insulation material. For example, the internal layer 13b of each pillar 13 may include an insulation material such as silicon oxide.

Between the first and second doping areas 12a and 12b, there is provided an insulation film 15 that is formed on exposed surfaces of the insulation materials 18, the pillars 13, and the substrate 11. For example, the insulation film 15 may be removed which is provided on a z-direction exposed surface of the last insulation material 18 provided along the z-direction.

Between the first and second doping areas 12a and 12b, first conductive materials 14a to 14i are provided on an exposed surface of the insulation film 15. For example, the first conductive material 14a is provided between the substrate 11 and the insulation material 18 adjacent to the substrate 11 and extends along the y-direction. In detail, the first conductive material 14a extending along the y-direction is provided between the substrate 11 and the insulation film 15 on a lower surface of the insulation material 18 adjacent to the substrate 11.

The same structure as that between the first and second doping areas 12a and 12b is provided between the second and third doping areas 12b and 12c. The same structure as that between the first and second doping areas 12a and 12b is provided between the third and fourth doping areas 12c and 12d.

Drains 16 are provided on the pillars 13. The drains 16 may be formed of an n-type silicon material. Second conductive materials 17a to 17c extending along the x-direction are provided on the drains 16. The second conductive materials 17a to 17c are sequentially disposed along the y-direction. The second conductive materials 17a to 17c are connected to the drains 16 at corresponding areas. For example, the drains 16 and the second conductive material extending along the x-direction may be connected through contact plugs.

In at least one example embodiment, each of the first conductive materials 14a to 14i forms a word line or a selection line SSL or GSL. Among the first conductive materials 14a to 14i, some 14b to 14i forming word lines may be interconnected on the same layer. A memory block BLKi may be selected when the first conductive materials 14a to 14i all are selected. The number of layers where the first conductive materials 14a to 14i are formed may not be limited to this disclosure. The number of layers where the first conductive materials 14a to 14i are formed may be changed variously according to a process technology or a control technology.

Figure 17:
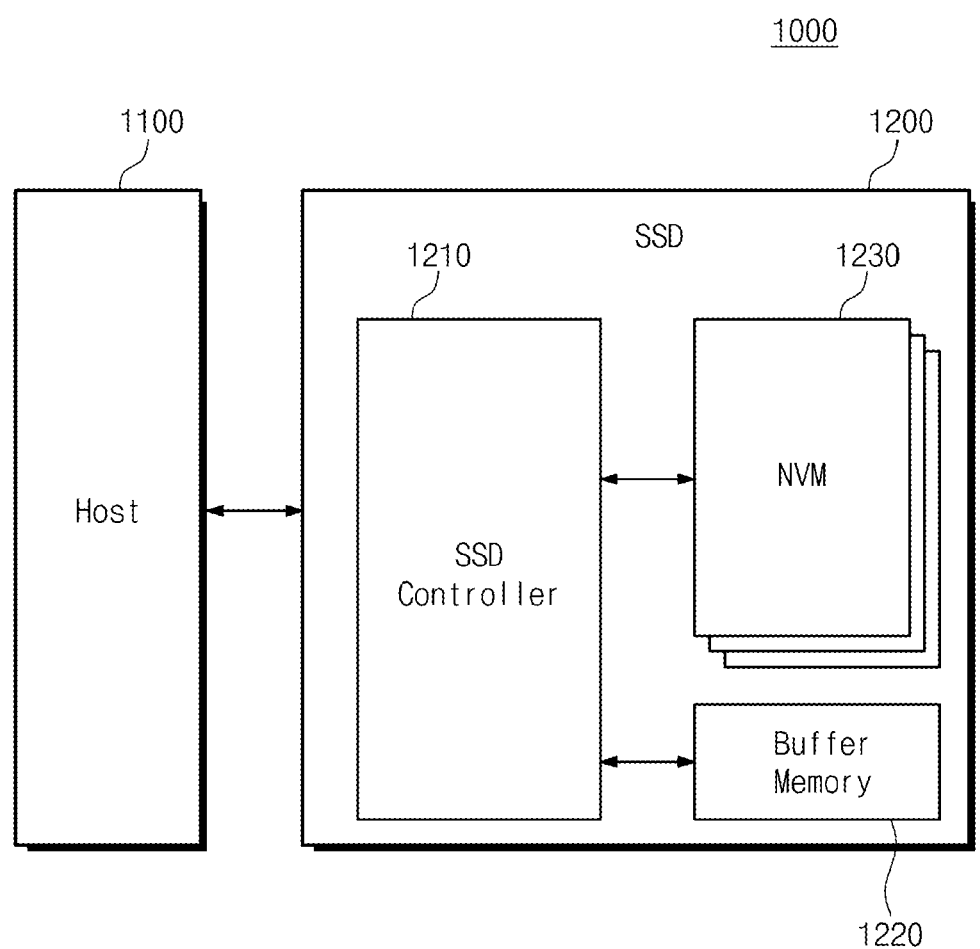
FIG. 17 is a block diagram illustrating a user device including a solid state drive according to at least one example embodiment of the inventive concepts.

FIG. 17 is a block diagram illustrating a user device including a solid state drive according to at least one example embodiment of the inventive concepts. Referring to FIG. 17, a user device 1000 includes a host 1100 and/or a solid state drive (hereinafter, referred to as SSD) 1200. The SSD 1200 includes an SSD controller 1210, a buffer memory 1220, and/or a nonvolatile memory device 1230.

The SSD controller 1210 provides physical interconnection between the host 1100 and the SSD 1200. The SSD controller 1210 provides an interface with the SSD 1200 corresponding to a bus format of the host 1100. For example, the SSD controller 1210 may determine an erase mode of the nonvolatile memory device 1230 based on a variety of status information from the host 1100 or a status of the buffer memory 1220. The bus format of the host 1100 may include USB (Universal Serial Bus), SCSI (Small Computer System Interface), PCI EXPRESS® (Peripheral Component Interconnect Express, often abbreviated as PCIe or PCI-E, a high-speed serial computer expansion bus standard), ATA, PATA (Parallel ATA), SATA (Serial ATA), SAS (Serial Attached SCSI), and the like.

The buffer memory 1220 may temporarily store write data provided from the host 1100 or data read out from the nonvolatile memory device 1230. In the event that data existing in the nonvolatile memory device 1230 is cached, at a read request of the host 1100, the buffer memory 1220 may support a cache function to provide cached data directly to the host 1100. Typically, a data transfer speed of a bus format (e.g., SATA or SAS) of the host 1100 may be higher than that of a memory channel of the SSD 1200. That is, in the event that an interface speed of the host 1100 is markedly fast, lowering of the performance due to a speed difference may be reduced or minimized by providing the buffer memory 1220 having a large storage capacity.

The nonvolatile memory device 1230 may be provided as storage medium of the SSD 1200. For example, the nonvolatile memory device 1230 may be a NAND flash memory device having a mass storage capacity. The nonvolatile memory device 1230 may be formed of a plurality of memory devices. In at least one example embodiment, memory devices may be connected with the SSD controller 1210 by the channel.

There is described an example in which as a storage medium, the nonvolatile memory device 1230 is formed of a NAND flash memory. However, the nonvolatile memory device 1230 is not limited to a NAND flash memory device. For example, a storage medium of the SSD 1200 can be formed of a PRAM, an MRAM, a ReRAM, a FRAM, a NOR flash memory, and the like. Further, the inventive concepts may be applied to a memory system which uses different types of memory devices together. The nonvolatile memory device 1230 may include a buffer area for a buffer program operation and a main area for a main program operation.

Figure 18:
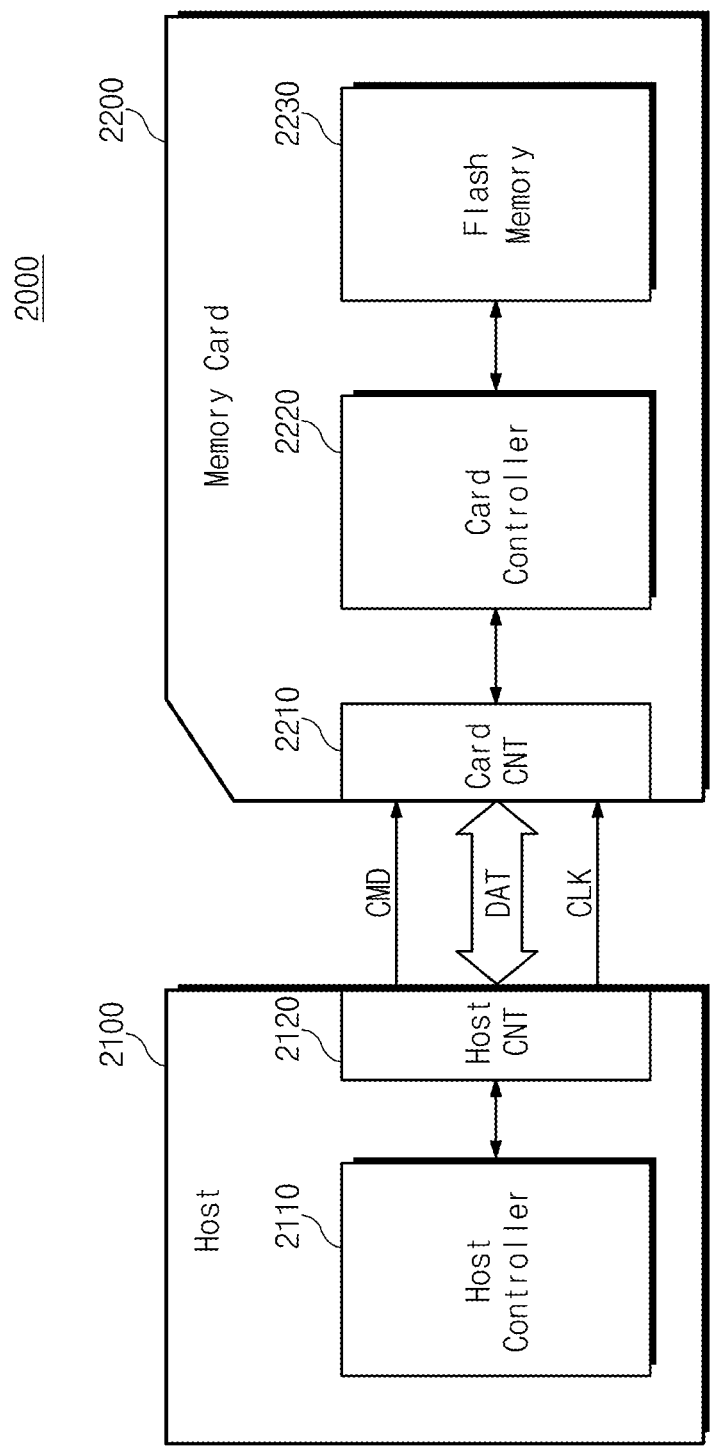
FIG. 18 is a block diagram illustrating a memory card system according to at least one example embodiment of the inventive concepts.

FIG. 18 is a block diagram illustrating a memory card system according to at least one example embodiment of the inventive concepts. Referring to FIG. 18, a memory card system 2000 includes a host 2100 and a memory card 2200. The host 2100 includes a host controller 2110 and a host connection unit 2120. The memory card 2200 includes a card connection unit 2210, a card controller 2220, and a flash memory 2230.

Each of the host connection unit 2120 and the card connection unit 2210 may be formed of a plurality of pins. Such pins may include a command pin, a data pin, a clock pin, a power pin, etc. The number of pins may vary according to a type of the memory card 2200.

The host 2100 is configured to write data in the memory card 2200 or to read data stored in the memory card 2200. The host controller 2110 may send a command (e.g., a write command), a clock signal CLK generated within a clock generator (not shown) of the host 2100, and data DAT to the memory card 2200 via the host connection unit 2120.

The card controller 2220 operates in response to a write command received via the card connection unit 2210 and stores data in the flash memory 2230 in synchronization with a clock signal generated by a clock generator (not shown) of the card controller 2220. The flash memory 2230 stores data transferred from the host 2100. For example, if the host 2100 is a digital camera, the flash memory 2230 may store image data. The memory card 2200 of the inventive concepts may be implemented by an embedded multi-media card (eMMC).

The card connection unit 2210 may be configured to communicate with an external device (e.g., a host) using one of various interface protocols, but not limited to, such as USB, MMC, PCI EXPRESS® (Peripheral Component Interconnect Express, often abbreviated as PCIe or PCI-E, a high-speed serial computer expansion bus standard), SAS, SATA, PATA, SCSI, ESDI, IDE, and the like.

Figure 19:
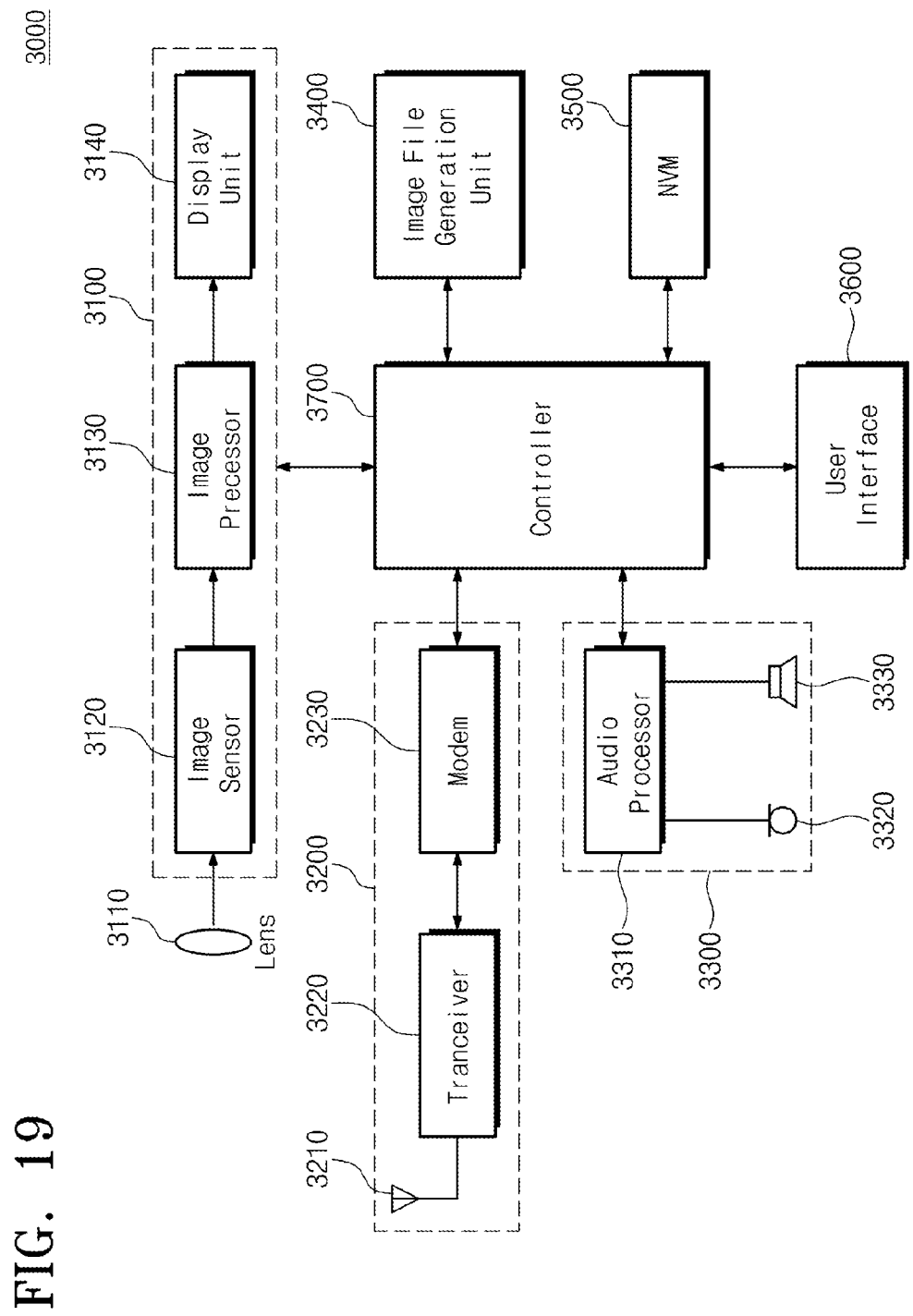
FIG. 19 is a block diagram schematically illustrating a handheld terminal according to at least one example embodiment of the inventive concepts.

FIG. 19 is a block diagram schematically illustrating a handheld terminal according to at least one embodiment of the inventive concepts. Referring to FIG. 19, a handheld terminal 3000 according to an embodiment of the inventive concepts includes an image processing unit 3100, a wireless transceiver unit 3200, an audio processing unit 3300, an image file generating unit 3400, a nonvolatile memory device 3500, a user interface 3600, and/or a controller 3700.

The image processing unit 3100 includes a lens 3110, an image sensor 3120, an image processor 3130, and a display unit 3140. The wireless transceiver unit 3200 includes an antenna 3210, a transceiver 3220, and a modem 3230. The audio processing unit 3300 includes an audio processor 3310, a microphone 3320, and a speaker 3330.

In at least one example embodiment, the nonvolatile memory device 3500 may be implemented with at least one of a memory system, a memory card, an SSD, and an eMMC that are driven according to at least one example embodiment of the inventive concepts. In at least one example embodiment, the nonvolatile memory device 3500 may have a variety of erase modes. The controller 3700 changes an erase mode of the nonvolatile memory device 3500 according to a variety of driving conditions. The controller 3700 controls the nonvolatile memory device 3500 to select a slow erase mode at a point in time when a user does not feel a decrease in performance.

A nonvolatile memory device and/or a memory controller according to at least one example embodiment of the inventive concepts may be packed by one selected from various types of packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

While the inventive concepts have been described with reference to example embodiments, it will be apparent to those skilled in the art that various changes and modifications may be made without departing from the spirit and scope of the present invention. Therefore, it should be understood that the above embodiments are not limiting, but illustrative.

What is claimed is:

1. An erase method of a nonvolatile memory device comprising:
   receiving an erase request;
   selecting an erase mode among a plurality of erase modes of a memory block corresponding to the erase request, based on an access condition of the nonvolatile memory device managed by a memory controller, the access condition including a status of a write buffer in which data to be written to the nonvolatile memory device is temporarily stored; and
   controlling the nonvolatile memory device to erase the memory block according to the selected erase mode,
   wherein the plurality of erase modes include a fast erase mode of which an erase time for the memory block is shorter than a reference time and a slow erase mode of which an erase time for the memory block is longer than the reference time.

2. The erase method of claim 1, wherein a level of an erase start pulse provided at the slow erase mode is lower than a level of an erase start pulse provided at the fast erase mode.

3. The erase method of claim 2, wherein the level of the erase start pulse provided at the slow erase mode gradually increases from a first voltage to a second voltage.

4. The erase method of claim 2, wherein a width of the erase start pulse provided at the slow erase mode is wider than a width of the erase start pulse provided at the fast erase mode.

5. The erase method of claim 1, wherein the erase mode is selected based on a ratio of an empty area to a whole memory area of the write buffer.

6. The erase method of claim 1, wherein the erase mode is selected based on a result of predicting an amount of data of the write buffer increased upon execution of the slow erase mode.

7. A storage device comprising:
   a nonvolatile memory device including a plurality of memory blocks and configured to erase a selected memory block according to an erase mode among a plurality of erase modes with different erase times; and
   a memory controller including a write buffer and configured to determine an erase mode of the selected memory block with reference to a status of the write buffer,
   wherein the plurality of erase modes comprises a fast erase mode of which an erase time is shorter than a reference time and a slow erase mode of which the erase time is longer than the reference time.

8. The storage device of claim 7, wherein the memory controller determines the erase mode to prevent the write buffer from overflowing.

9. The storage device of claim 7, wherein the memory controller determines the erase mode based on a result of predicting an amount of data of the write buffer increased upon execution of the plurality of erase modes.

10. The storage device of claim 7, wherein a voltage level of an erase start pulse applied to the selected memory block in the slow erase mode is lower than a voltage level of an erase start pulse applied to the selected memory block in the fast erase mode.

11. The storage device of claim 10, wherein a pulse width of the erase start pulse applied to the selected memory block in the slow erase mode is wider than a pulse width of the erase start pulse applied to the selected memory block in the fast erase mode.

12. The storage device of claim 7, wherein a voltage level of an erase start pulse applied to the selected memory block in the slow erase mode is incrementally increased during a period of the erase start pulse.

* * * * *